(12) United States Patent
Fujishiro et al.

(10) Patent No.: US 10,798,531 B2
(45) Date of Patent: Oct. 6, 2020

(54) RADIO TERMINAL AND BASE STATION

(71) Applicant: KYOCERA Corporation, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/399,346

(22) Filed: Apr. 30, 2019

(65) Prior Publication Data

US 2019/0261139 A1 Aug. 22, 2019

Related U.S. Application Data

(63) Continuation of application No. PCT/JP2017/039608, filed on Nov. 1, 2017.
(Continued)

(51) Int. Cl.
*H04W 4/06* (2009.01)
*H04L 5/06* (2006.01)
(Continued)

(52) U.S. Cl.
CPC .............. *H04W 4/06* (2013.01); *H04L 5/06* (2013.01); *H04L 12/18* (2013.01); *H04L 49/201* (2013.01); *H04W 4/12* (2013.01); *H04W 48/16* (2013.01); *H04W 48/20* (2013.01); *H04W 84/045* (2013.01)

(58) Field of Classification Search
CPC ......... H04W 36/30; H04W 4/06; H04W 4/12; H04W 4/18; H04W 36/06; H04W 36/165; H04W 48/20; H04W 84/045; H04W 76/40; H04W 76/27; H04W 76/19; H04W 76/34; H04W 76/30; H04W 36/0007; H04L 5/06; H04L 49/201
See application file for complete search history.

(56) References Cited

U.S. PATENT DOCUMENTS

2014/0204894 A1 7/2014 Chang et al.
2017/0265166 A1* 9/2017 Hosseini ............... H04W 76/28
(Continued)

FOREIGN PATENT DOCUMENTS

WO 2013/024802 A1 2/2013
WO WO-2018066858 A1 * 4/2018 ............ H04W 48/16

OTHER PUBLICATIONS

LG Electronics; "Multicast Support for eNB-IoT"; 3GPP TSG RAN WG1 Meeting #86; R1-167877; Aug. 22-26, 2016; pp. 1-5; Gothenburg, Sweden.
(Continued)

*Primary Examiner* — Khawar Iqbal
(74) *Attorney, Agent, or Firm* — Studebaker & Brackett PC

(57) ABSTRACT

A radio terminal according to one embodiment is a radio terminal for a mobile communication system supporting MBMS. The radio terminal comprises a receiver configured to receive level information from a base station; and a controller configured to perform a process of receiving an MBMS signal from the base station, based on the level information. The MBMS signal is transmitted from the base station using an enhanced coverage function for enhancing a coverage of the base station. The level information is information on an enhanced coverage level corresponding to the MBMS signal.

3 Claims, 18 Drawing Sheets

Related U.S. Application Data

(60) Provisional application No. 62/417,505, filed on Nov. 4, 2016.

(51) Int. Cl.
  *H04L 12/18* (2006.01)
  *H04L 12/931* (2013.01)
  *H04W 4/12* (2009.01)
  *H04W 48/20* (2009.01)
  *H04W 84/04* (2009.01)
  *H04W 48/16* (2009.01)

(56) References Cited

U.S. PATENT DOCUMENTS

| | | | | |
|---|---|---|---|---|
| 2017/0290014 A1* | 10/2017 | Kim | ............ | H04W 72/0453 |
| 2018/0020426 A1* | 1/2018 | Yi | ............ | H04W 72/005 |
| 2018/0054714 A1* | 2/2018 | Lee | ............ | H04W 76/40 |
| 2018/0167881 A1* | 6/2018 | Lee | ............ | H04W 76/28 |
| 2018/0249481 A1* | 8/2018 | Xu | ............ | H04W 4/06 |
| 2018/0249510 A1* | 8/2018 | Lee | ............ | H04W 24/08 |
| 2019/0007891 A1* | 1/2019 | Xu | ............ | H04W 76/40 |
| 2019/0098604 A1* | 3/2019 | Park | ............ | H04W 4/40 |
| 2019/0182802 A1* | 6/2019 | Yu | ............ | H04W 72/1289 |
| 2019/0306667 A1* | 10/2019 | Kim | ............ | H04B 17/318 |
| 2019/0394707 A1* | 12/2019 | Wong | ............ | H04W 68/005 |
| 2020/0008097 A1* | 1/2020 | Fujishiro | ............ | H04W 76/11 |
| 2020/0008130 A1* | 1/2020 | Yavuz | ............ | H04L 5/0053 |
| 2020/0059835 A1* | 2/2020 | Kim | ............ | H04W 76/27 |

OTHER PUBLICATIONS

Ericsson; "Coverage Enhancement in Multicast for eMTC and NB-IoT UEs"; 3GPP TSG-RAN WG2 #95bis; R2-167089; Oct. 10-14, 2016; pp. 1-4; Kaohsiung, Taiwan.

LG Electronics Inc.; "Considerations on multicast support for feMTC"; 3GPP TSG-RAN WG2 Meeting #95bis; R2-167104; Oct. 10-14, 2016; total 3 pages; Kaohsiung, Taiwan.

\* cited by examiner

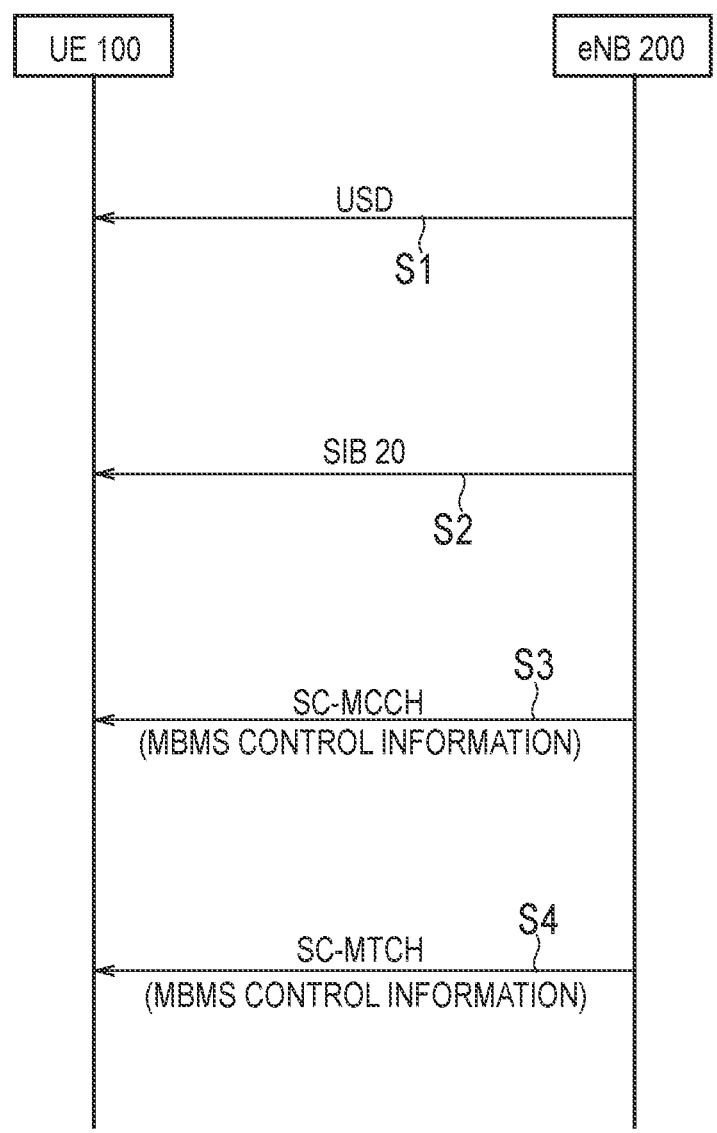

FIG. 9

SystemInformationBlockType20 information element

```
-- ASN1START

SystemInformationBlockType20-r13 ::=    SEQUENCE {
    sc-mcch-RepetionPeriod-r13          ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9) OPTIONAL,
    sc-mcch-ModificationPeriod-r13      ENUMERATED {rf2, rf4, rf8, rf16, rf32, rf64, rf128, rf256,
                                                    rf512, rf1024, rf2048, rf4096, rf8192, rf16384, rf32768,
                                                    rf65536},
    lateNonCriticalExtension            OCTET STRING                       OPTIONAL,
    ...
}

-- ASN1STOP
```

FIG. 10

```
                    SCPTMConfiguration message

-- ASN1START

SCPTMConfiguration-r13 ::=    SEQUENCE {
    sc-mtch-InfoList-r13          SC-MTCH-InfoList-r13,
    scptm-NeighbourCellList-r13   SCPTM-NeighbourCellList-r13   OPTIONAL,   -- Need OP
    lateNonCriticalExtension      OCTET STRING                  OPTIONAL,
    nonCriticalExtension          SEQUENCE {}                   OPTIONAL
}

-- ASN1STOP
```

```
                SC-MTCH-InfoList information element

-- ASN1START

SC-MTCH-InfoList-r13 ::=       SEQUENCE (SIZE (0..maxSC-MTCH-r13)) OF SC-MTCH-Info-r13

SC-MTCH-Info-r13 ::=           SEQUENCE {
    mbmsSessionInfo-r13            MBMSSessionInfo-r13,
    g-RNTI-r13                     BIT STRING (SIZE(16)),
    sc-mtch-schedulingInfo-r13     SC-MTCH-SchedulingInfo-r13         OPTIONAL,  --
Need OP
    sc-mtch-neighbourCell-r13      BIT STRING (SIZE(maxNeighCell-SCPTM-r13))
    OPTIONAL,     -- Need OP
    ...
}

MBMSSessionInfo-r13 ::=        SEQUENCE {
    tmgi-r13                       TMGI-r9,
    sessionId-r13                  OCTET STRING (SIZE (1))     OPTIONAL   -- Need OP
}

SC-MTCH-SchedulingInfo-r13::=  SEQUENCE {
    onDurationTimerSCPTM-r13           ENUMERATED {
                                         psf1, psf2, psf3, psf4, psf5, psf6,
                                         psf8, psf10, psf20, psf30, psf40,
                                         psf50, psf60, psf80, psf100,
                                         psf200},
    drx-InactivityTimerSCPTM-r13       ENUMERATED {
                                         psf0, psf1, psf2, psf4, psf8,
                                         psf10, psf20, psf40,
                                         psf80, psf160, ps320,
                                         psf640, psf960,
                                         psf1280, psf1920, psf2560},
    schedulingPeriodStartOffsetSCPTM-r13   CHOICE {
        sf10                               INTEGER(0..9),
        sf20                               INTEGER(0..19),
        sf32                               INTEGER(0..31),
        sf40                               INTEGER(0..39),
        sf64                               INTEGER(0..63),
        sf80                               INTEGER(0..79),
        sf128                              INTEGER(0..127),
        sf160                              INTEGER(0..159),
        sf256                              INTEGER(0..255),
        sf320                              INTEGER(0..319),
        sf512                              INTEGER(0..511),
        sf640                              INTEGER(0..639),
        sf1024                             INTEGER(0..1023),
        sf2048                             INTEGER(0..2048),
        sf4096                             INTEGER(0..4096),
        sf8192                             INTEGER(0..8192)
    },
    ...
}

-- ASN1STOP
```

```
-- ASN1START

SCPTM-NeighbourCellList-r13 ::=   SEQUENCE (SIZE (1..maxNeighCell-SCPTM-r13)) OF PCI-ARFCN-r13

PCI-ARFCN-r13 ::=   SEQUENCE {
    physCellId-r13          PhysCellId,
    carrierFreq-r13         ARFCN-ValueEUTRA-r9     OPTIONAL
}

-- ASN1STOP
```

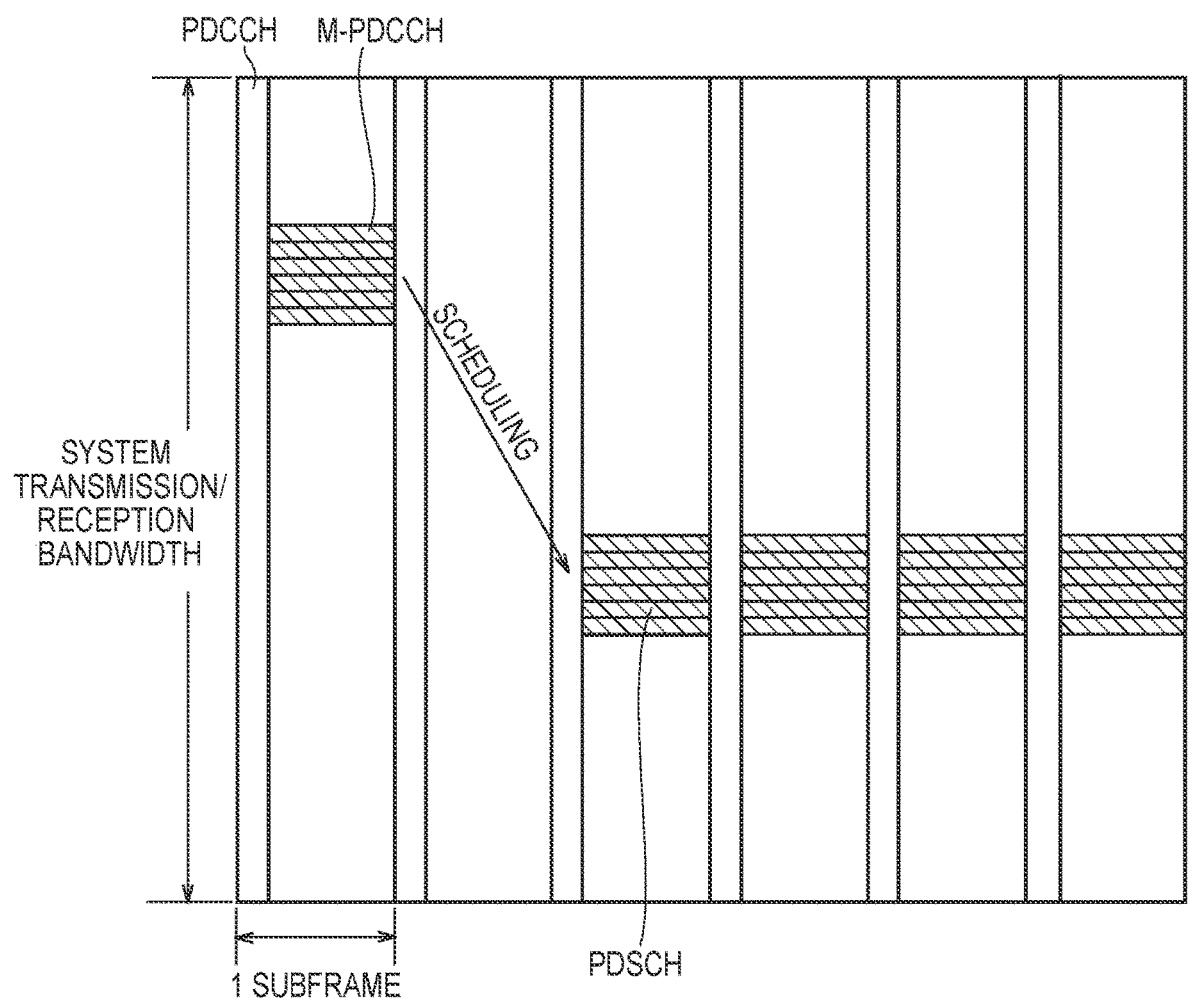

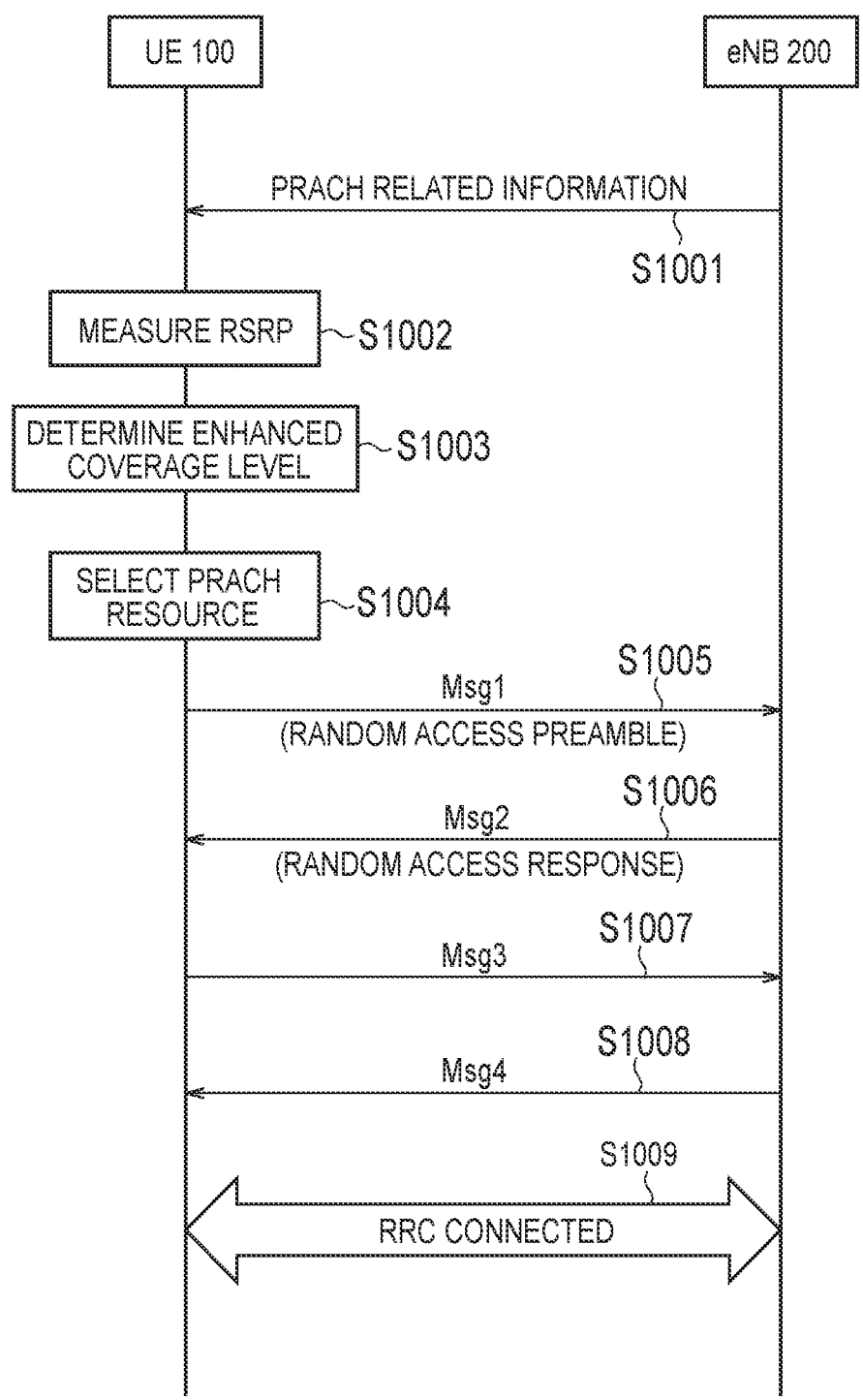

FIG. 19

```
SC-MTCH-InfoList-r13 ::=              SEQUENCE (SIZE (0..maxSC-MTCH-r13)) OF SC-
MTCH-Info-r13

SC-MTCH-Info-r13 ::=                  SEQUENCE    {
mbmsSessionInfo-r13                      MBMSSessionInfo-r13,
g-RNTI-r13                               BIT STRING(SIZE(16)),
sc-mtch-schedulingInfo-r13               SC-MTCH-SchedulingInfo-r13
    OPTIONAL,    -- Need OP
sc-mtch-neighbourCell-r13                BIT  STRING  (SIZE(maxNeighCell-SCPTM-
r13))  OPTIONAL,    -- Need OP
...
[[  sc-mtch-neighbourCell-BL-r14            BIT    STRING    (SIZE(maxNeighCell-
SCPTM-r13)) OPTIONAL,    -- Need OP
sc-mtch-neighbourCell-NB-r14            BIT   STRING   (SIZE(maxNeighCell-SCPTM-
r13))   OPTIONAL,    -- Need OP
]],
}
```

FIG. 20

```
SCPTM-NeighbourCellList-r13 ::=   SEQUENCE   (SIZE   (1..maxNeighCell-SCPTM-
r13)) OF PCI-ARFCN-r13

PCI-ARFCN-r13 ::=                 SEQUENCE {
physCellId-r13                       PhysCellId,
carrierFreq-r13                      ARFCN-ValueEUTRA-r9     OPTIONAL
NarrowbandOperation-r14        ENUMERATED {true}        OPTIONAL
carrierFreqOffset-r14          ENUMERATED {
v-10,v-9,v-8,v-7,v-6,v-5,v-4,v-3,v-2,v-1,v-0dot5,
v0,  v1, v2,v3,  v4,  v5, v6,  v7, v8,  v9
} OPTIONAL
}
```

RADIO TERMINAL AND BASE STATION

RELATED APPLICATION

This application is a continuation application of international application PCT/JP2017/039608, filed Nov. 1, 2017, which claims the benefit of U.S. Provisional Application No. 62/417,505, filed on Nov. 4, 2016, the entire contents of which are incorporated herein by reference.

TECHNICAL FIELD

The present invention relates to a radio terminal and a base station for a mobile communication system.

BACKGROUND ART

In 3GPP (Third Generation Partnership Project), which is a project aiming to standardize a mobile communication system, the specifications of MBMS (Multimedia Broadcast Multicast Service) transmission have been laid out to provide a radio terminal with a multicast/broadcast service. Schemes for MBMS include two schemes: MBSFN (Multicast Broadcast Single Frequency Network) and SC-PTM (Single Cell Point-To-Multipoint).

Meanwhile, radio terminals for MTC (Machine Type Communication) and IoT (Internet of Things) services, which perform communication without human intervention, have been studied. Such a radio terminal is required to achieve low cost, wide coverage area, and low power consumption. For this reason, in 3GPP, a category for radio terminals having a transmission and reception bandwidth limited to just a part of the system bandwidth (system transmission and reception band) is specified. An enhanced coverage function including repetition and the like is applied to a radio terminal in such a new category.

SUMMARY

A radio terminal according to one embodiment is a radio terminal for a mobile communication system supporting MBMS. The radio terminal comprises a receiver configured to receive level information from a base station; and a controller configured to perform a process of receiving an MBMS signal from the base station, based on the level information. The MBMS signal is transmitted from the base station using an enhanced coverage function for enhancing a coverage of the base station. The level information is information on an enhanced coverage level corresponding to the MBMS signal.

A base station according to one embodiment is a base station for a mobile communication system supporting MBMS. The base station comprises: a transmitter configured to transmit an MBMS signal using an enhanced coverage function for enhancing a coverage of the base station; a controller configured to notify a radio terminal of level information on an enhanced coverage level corresponding to the MBMS signal.

A radio terminal according to one embodiment is a radio terminal for a mobile communication system supporting MBMS. The radio terminal comprises: a controller configured to perform a cell reselection operation for selecting a cell different from a current serving cell as a serving cell. If the radio terminal needs to use an enhanced coverage function, the controller performs the cell reselection according to a ranking based on a radio quality. If the radio terminal needs to use the enhanced coverage function and the radio terminal is receiving or interested in receiving an MBMS signal, the controller performs the ranking to preferentially select a cell from which the MBMS signal is transmitted.

BRIEF DESCRIPTION OF THE DRAWINGS

FIG. 8 is a flowchart illustrating an operation example of SC-PTM according to the embodiment.

FIG. 9 is a diagram showing an SIB 20 according to the embodiment.

FIG. 10 is a diagram showing MBMS control information in SC-MCCH according to the embodiment.

FIG. 11 is a diagram illustrating a downlink physical channel for an eMTC UE according to the embodiment.

FIG. 12 is a flowchart illustrating a random access procedure for an eMTC UE and an NB-IoT UE.

FIG. 19 is a diagram according to the supplementary note.
FIG. 20 is a diagram according to the supplementary note.

DESCRIPTION OF THE EMBODIMENT (Mobile Communication System)

Figure 1:
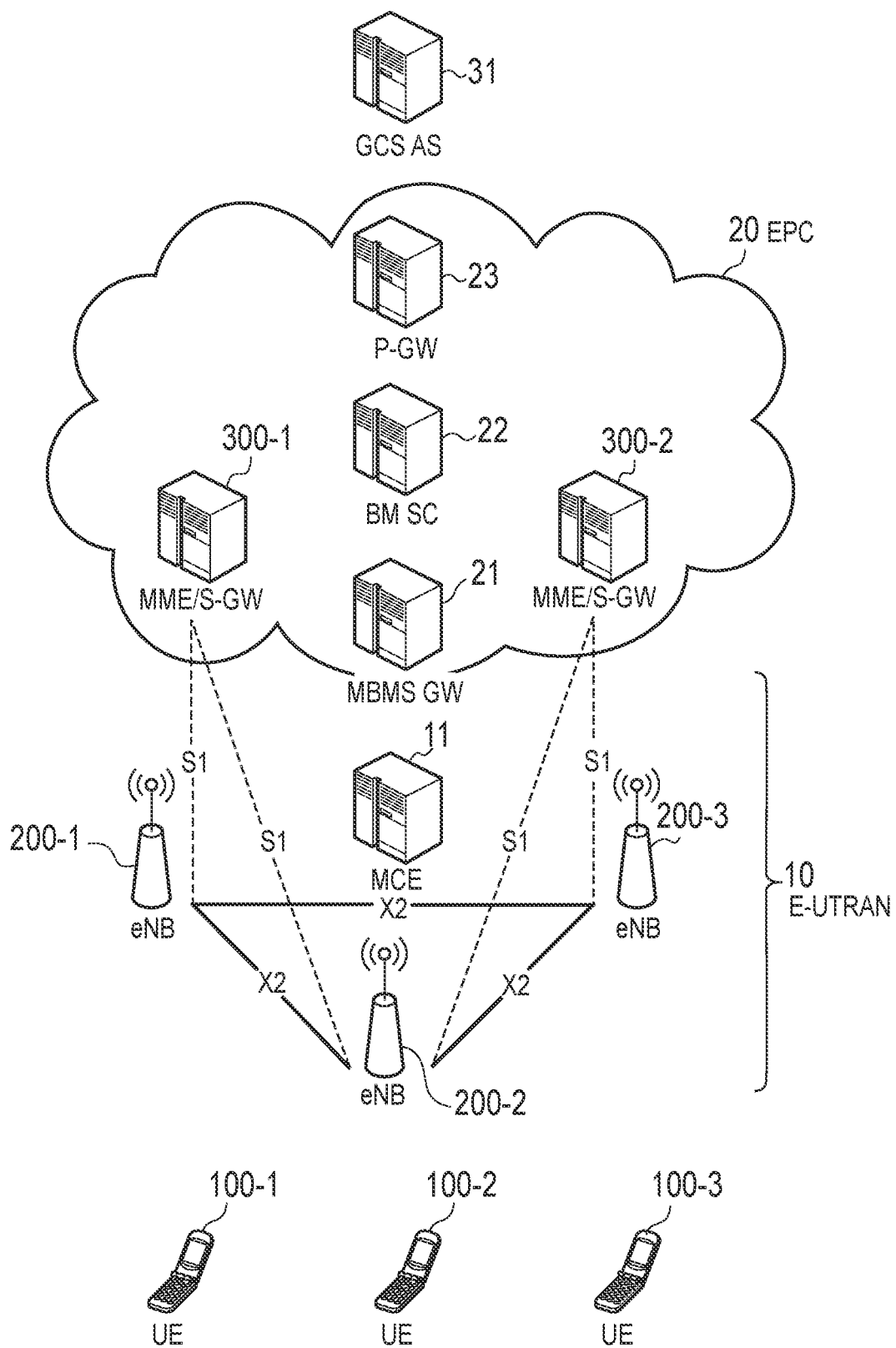
FIG. 1 is a diagram illustrating a configuration of an LTE system according to an embodiment.
Figure 2:
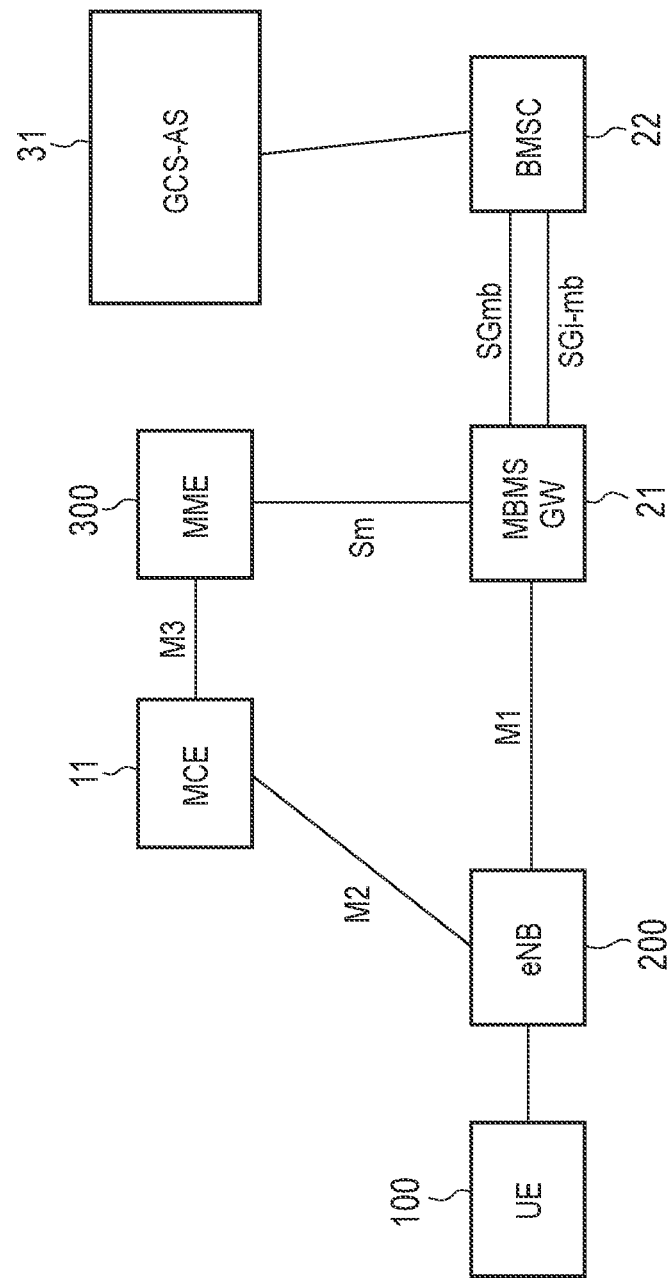
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN. On the other hand, the scheduling of the SC-PTM is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

Further, a GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface. The GCS AS 31 is connected to the P-GW 23 via the SGi interface. The GCS AS 31 performs management of groups and data distribution etc. in group communication.

Figure 3:
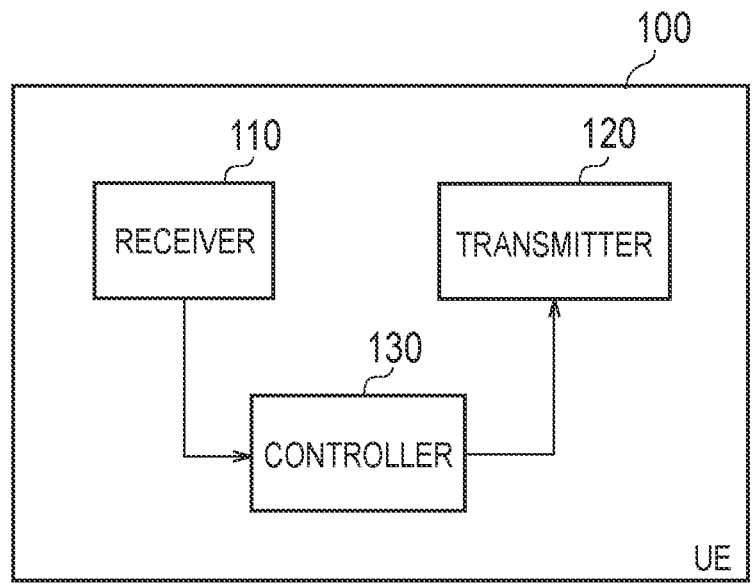
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal) and outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal and transmits the radio signal from the antennas.

The controller 130 performs various controls in the UE 100. The controller 130 includes a processor and a memory. The memory stores programs executed by the processor and information used for processing by the processor. The processor includes a baseband processor that performs modulation and demodulation, encoding, decoding, and the like of the baseband signal and a CPU (Central Processing Unit) that performs various processes by executing programs stored in the memory. The processor may include a codec that performs encoding/decoding audio/video signals. The processor executes various processes to be described later.

Figure 4:
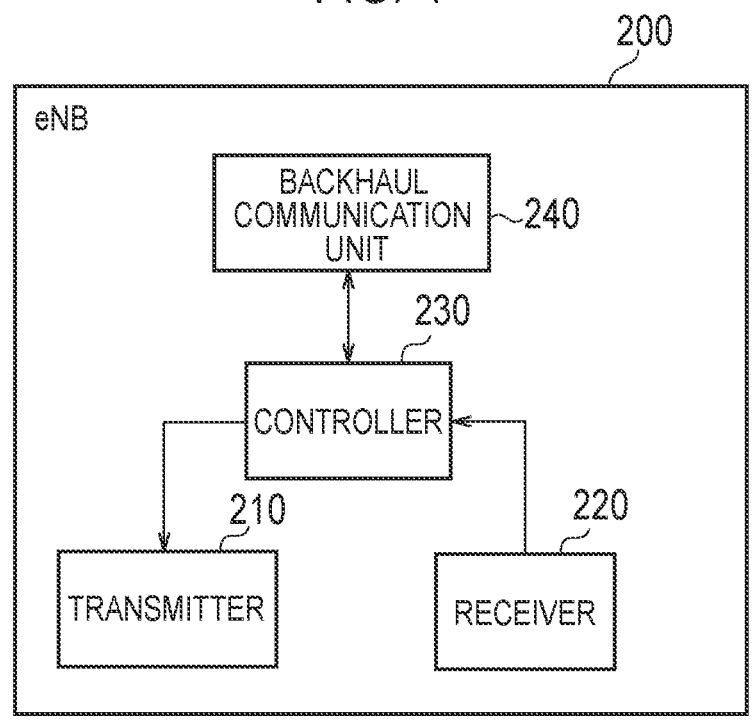
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal and transmits the radio signal from the antennas.

The receiver 220 performs various types of reception under the control of the controller 230. The receiver 220 includes antennas and a receiving machine. The receiving machine converts the radio signal received by the antennas into a baseband signal (received signal) and outputs the baseband signal to the controller 230.

The controller 230 performs various controls in the eNB 200. The controller 230 includes a processor and a memory. The memory stores programs executed by the processor and information used for processing by the processor. The processor includes a baseband processor that performs modulation and demodulation, encoding, decoding, and the like of the baseband signal and a CPU that performs various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like. The backhaul communication unit 240 can also be used for communication on the M1 interface and for communication on the M2 interface.

Figure 5:
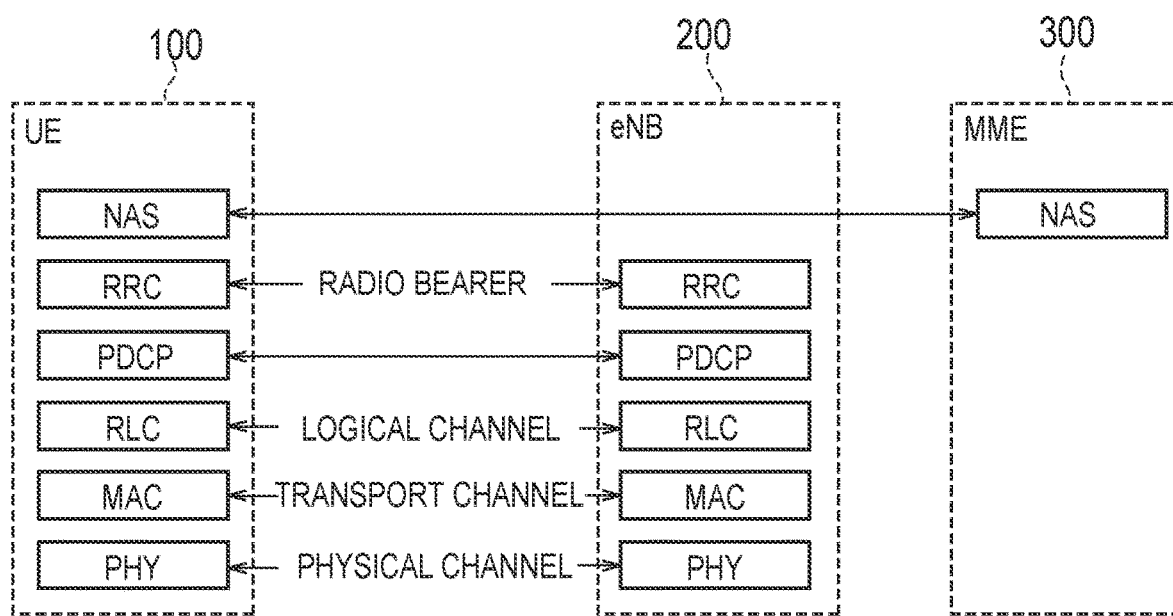
FIG. 5 is a diagram illustrating a protocol stack of a radio interface in an LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in an RRC connected state, otherwise the UE 100 is in an RRC idle state.

The NAS (Non-Access Stratum) layer located above the RRC layer performs session management, mobility management, and the like.

Figure 6A:
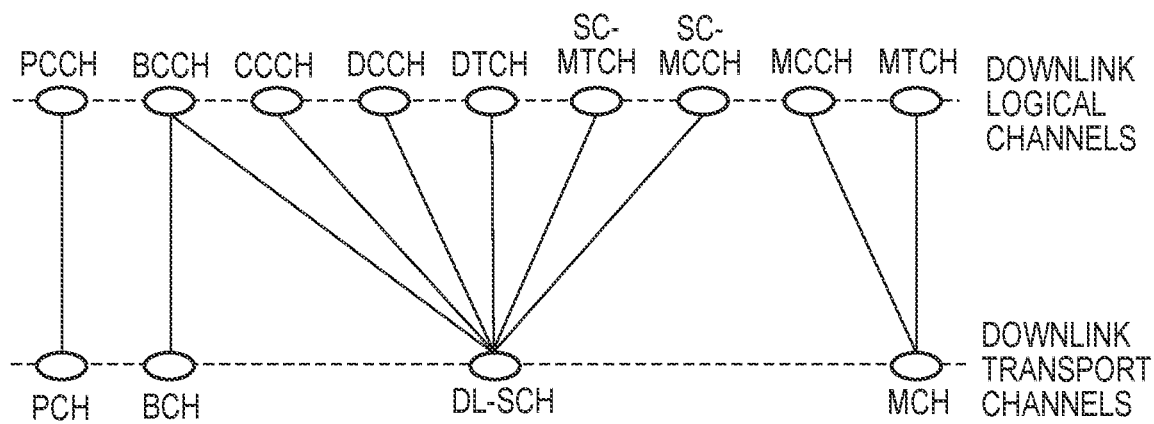
FIG. 6A is a diagram illustrating a channel configuration of a downlink of the LTE system according to the embodiment.
Figure 6B:
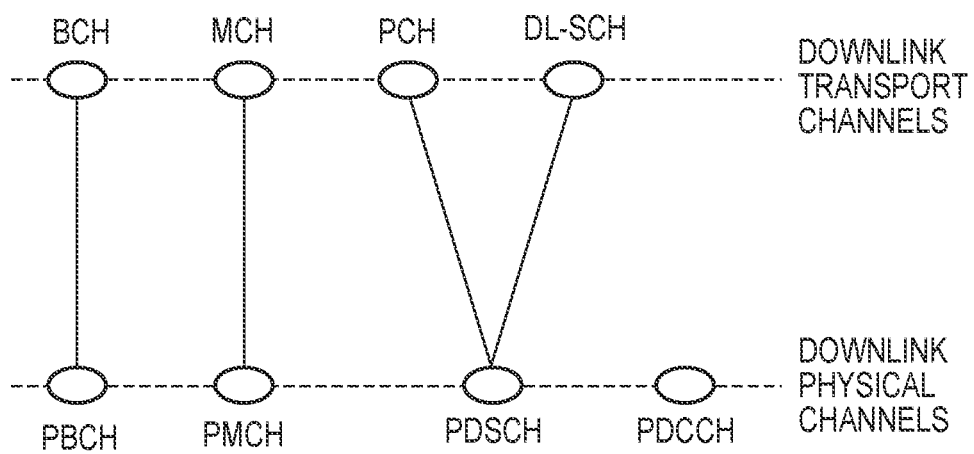
FIG. 6B is a diagram illustrating a channel configuration of a downlink of the LTE system according to the embodiment.

FIG. 6 is a diagram illustrating a channel configuration of downlink of the LTE system. FIG. 6(*a*) illustrates mapping between a logical channel (Downlink Logical Channel) and a transport channel (Downlink Transport Channel).

As illustrated in FIG. 6(*a*), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM. The SC-MTCH is a point-to-multipoint downlink channel for multicast transmitting data (MBMS) from the network to the UE 100 by using the SC-PTM.

SC-MCCH (Single Cell Multicast Control Channel) is a logical channel for SC-PTM. The SC-MCCH is a point-to-multipoint downlink channel for multicast transmitting MBMS control information for one or more SC-MTCHs from the network to the UE 100. The SC-MCCH is used for a UE 100 that is to receive an MBMS using SC-PTM or that is interested in the reception. Further, there is only one SC-MCCH in one cell.

MCCH (Multicast Control Channel) is a logical channel for MBSFN. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN. The MTCH is mapped to the MCH.

FIG. 6(*b*) illustrates mapping between a transport channel (Downlink Transport Channel) and a physical channel (Downlink Physical Channel).

As illustrated in FIG. 6(*b*), the BCH is mapped to PBCH (Physical Broadcast Channel).

The MCH is mapped to PMCH (Physical Multicast Channel). The MCH supports MBSFN by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
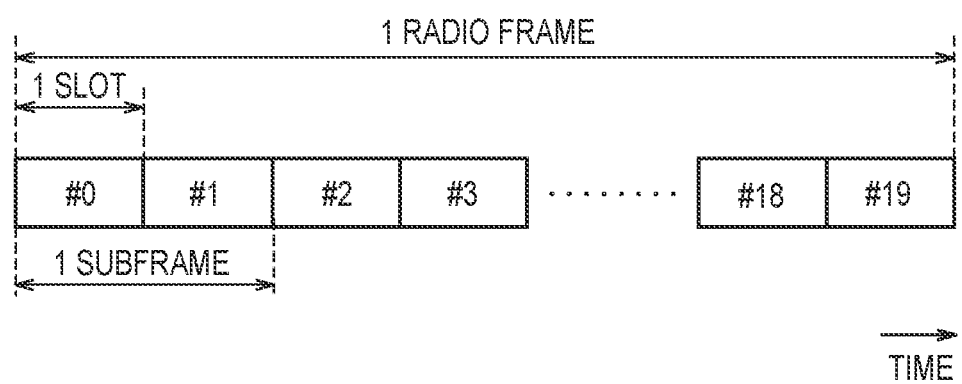
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN may be set.

In the uplink, both ends in the frequency direction of each subframe are regions used as the PUCCH for mainly transmitting a uplink control signal. The remaining portion of each subframe is a region available as the PUSCH for mainly transmitting uplink data.

[Outline of Cell Reselection Operation]

Next, outline of cell reselection operation will be described. The UE 100 under RRC idle state measures, if a start condition is satisfied, the quality of an adjacent cell adjacent to the current serving cell, and selects, from among the cells that satisfy a selection condition, the target cell used as a serving cell.

Firstly, the start condition is shown as follows:

(A1) A frequency having a higher priority than the priority of the frequency of the current serving cell the UE 100 always measures the quality of the frequency having the higher priority.

(A2) A frequency having a priority equal to or lower than the priority of the frequency of the current serving cell the UE 100 measures, if the quality of the current serving cell falls below a predetermined threshold value, the quality of the frequency having the equal priority or the lower priority.

Secondly, the selection condition is shown as follows:

(B1) The priority of the frequency of the adjacent cell is higher than the priority of the current serving cell the UE 100 selects a cell that satisfies a relationship of Squal>ThreshX, HighQ over a predetermined period (TreselectionRAT), or a cell that satisfies a relationship of Srxlev>ThreshX, HighP over the predetermined period (TreselectionRAT). In such a case, such criteria to be satisfied by the adjacent cell may be referred to as "S-criteria".

It is noted that Squal represents a cell selection quality level. Squal is calculated by Squal=Qqualmeas−(Qqualmin+Qqualminoffset)−Qoffsettemp. Qqualmeas is a quality level (RSRQ) of the adjacent cell, Qqualmin is a minimum required quality level, Qqualminoffset is a predetermined offset regularly applied to the adjacent cell, and Qoffsettemp is an offset temporarily applied to the adjacent cell. ThreshX, HighQ is a predetermined threshold value.

Further, Srxlev represents a cell selection reception level. Srxlev is calculated by Srxlev=Qrxlevmeas−(Qrxlevmin+Qrxlevminoffset)−Pcompensation−Qoffsettemp. Qrxlevmeas is a reception level (RSRP) of the adjacent cell, Qrxlevmin is a minimum required reception level, Qrxlevminoffset is a predetermined offset regularly applied to the adjacent cell, Pcompensation is a parameter related to an uplink capability, and Qoffsettemp is an offset temporarily applied to the adjacent cell. ThreshX, HighP is a predetermined threshold value.

(B2) The priority of the frequency of the adjacent cell is the same as the priority of the current serving cell the UE 100 calculates a ranking Rs of the current serving cell and a ranking Rn of the adjacent cell, and selects a cell having a higher ranking Rn than Rs over a predetermined period (TreselectionRAT) as the target cell. In such a case, such criteria to be satisfied by the adjacent cell maybe referred to as "R-criteria".

It is noted that Rs is calculated by Rs=Qmeas,s+QHyst−Qoffsettemp. Rn is calculated by Rn=Qmeas,n−Qoffset−Qoffsettemp. Qmeas,s is the reception level (RSRP) of the current serving cell, and Qmeas,n is the reception level (RSRP) of the adjacent cell. QHyst is a hysteresis value for achieving preferential reselection of the current serving cell as the target cell. Qoffsettemp is an offset temporarily applied to the current serving cell and the adjacent cell.

(B3) The priority of the frequency of the adjacent cell is lower than the priority of the current serving cell the UE 100 selects, under a premise that Squal<ThreshServing, LowQ is satisfied over a predetermined period (TreselectionRAT), or Srxlev<ThreshServing, LowP is satisfied over the predetermined period (TreselectionRAT), the target cell from among the adjacent cells by a method similar to the above described (B1).

It is noted that ThreshServing, LowQ and ThreshServing, LowP are predetermined threshold values similarly to ThreshX, HighQ and ThreshX, HighP.

It is noted that various types of parameters used for selecting the target cell are included in system information (SIB; System Information Block) broadcast from the eNB 200. The various types of parameters include the priority of the frequency (cellReselectionPriority), a predetermined period (TreselectionRAT), various types of offsets (Qqualminoffset, Qrxlevminoffset, Qoffsettemp, QHyst, Qoffset), and various types of threshold values (ThreshX, HighQ, ThreshX, HighP, ThreshServing, LowQ, ThreshServing, LowP).

(Outline of SC-PTM)

Next, outline of SC-PTM will be described. Radio transmission schemes for MBMS include two schemes: MBSFN and SC-PTM. In the MBSFN, data is transmitted via the PMCH for each MBSFN area including a plurality of cells. In contrast, in the SC-PTM, data is transmitted via the PDSCH for each cell. In the following, a scenario in which the UE 100 performs SC-PTM reception is mainly assumed. However, MBSFN may be assumed.

The UE 100 may receive the MBMS service in the RRC connected state or may receive the MBMS service in the RRC idle state. In the following, it is mainly assumed that the UE 100 receives the MBMS service in the RRC idle state.

FIG. 8 is a diagram illustrating an operation example of SC-PTM.

As illustrated in FIG. 8, in step S1, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S2, the UE 100 receives a SIB 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod representing a cycle in which the content of the SC-MCCH can be changed, sc-mcch-RepetitionPeriod representing a transmission (retransmission) time interval of the SC-MCCH in the number of radio frames, sc-mcch-Offset representing a scheduled radio frame offset of the SC-MCCH, sc-mcch-Subframe representing a subframe in which the SC-MCCH is scheduled, and so forth.

In step S3, the UE 100 receives MBMS control information from the eNB 200 via the SC-MCCH, based on the SIB 20. MBMS control information may be also called SCPTM configuration information (SCPTM Configuration). For the SC-MCCH transmission in the physical layer, an SC-RNTI (Single Cell RNTI) is used. FIG. 10 is a diagram illustrating the MBMS control information (SC-PTM configuration information) in the SC-MCCH. As illustrated in FIG. 10, the SC-PTM configuration information includes control information applicable to the MBMS service, which is transmitted via SC-MRB (Single Cell MBMS Point to Multipoint Radio Bearer). The SC-PTM configuration information includes sc-mtch-InfoList containing configuration for each SC-MTCH in the cell transmitting that information, and scptmNeighbourCellList being a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSessionInfo) to be transmitted via the SC-MRB, a G-RNTI (Group RNTI) corresponding to the MBMS session, and sc-mtch-schedulingInfo being DRX information for the SC-MTCH. The mbmsSessionInfo contains a TMGI and a session ID (sessionId) to identify the MBMS service. The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset.

In step S4, the UE 100 receives the MBMS service (MBMS data) corresponding to the TMGI, in which the UE 100 itself is interested, via the SC-MTCH, based on SC-MTCH-SchedulingInfo in the SC-PTM configuration information. In the physical layer, the eNB 200, after transmitting the PDCCH by using the G-RNTI, transmits the MBMS data via the PDSCH.

It should be noted that the control signal (signaling) described with reference to FIG. 8 is an example. Due to optimization for power saving reception or the like, part of the control signals may be omitted or the order of the control signals may be changed.

(Outline of eMTC and NB-IoT)

Next, outline of eMTC and NB-IoT will be described. In the embodiment, a scenario where a UE 100 in a new category exists is assumed. The UE 100 in the new category is a UE 100 whose transmission and reception bandwidth is limited only to a part of the system transmission and reception band. The new UE category is referred to as, for example, category M1 and NB (Narrow Band)-IoT category. Here, the category M1 is an eMTC (enhanced Machine Type Communications) UE. The NB-IoT UE is category NB1. The category M1 limits the transmission and reception bandwidth of the UE 100 to 1.08 MHz (that is, the bandwidth of six resource blocks) and supports an enhanced coverage (EC) function using repetition and the like. The NB-IoT category further limits the transmission and reception bandwidth of the UE 100 to 180 kHz (that is, the bandwidth of one resource block) and supports the enhanced coverage function. Repetition is a technique of repeatedly transmitting the same signal using a plurality of subframes. As an example, the system bandwidth of the LTE system is 10 MHz, of which the transmission and reception bandwidth is 9 MHz (that is, the bandwidth of 50 resource blocks). On the other hand, the UE 100 in the M1 category cannot receive normal PDCCH because it cannot receive a downlink radio signal transmitted with a wider bandwidth than six resource blocks. For this reason, MPDCCH (MTC-PDCCH) being PDCCH for MTC is introduced. For the same reason, NPDCCH (NB-PDCCH) being PDCCH for NB-IoT is introduced.

FIG. 11 is a diagram illustrating a downlink physical channel for the eMTC UE. As illustrated in FIG. 11, the eNB 200 transmits MPDCCH within six resource blocks. The MPDCCH includes scheduling information for allocating PDSCH. As an example, the MPDCCH allocates PDSCH of a subframe different from the subframe in which the MPDCCH is transmitted. The eNB 200 transmits the PDSCH within six resource blocks. Further, the eNB 200 allocates PDSCHs to a plurality of subframes in order to perform repetition of the same signal. The UE 100 in category M1 identifies the allocated PDSCH by receiving the MPDCCH and receives data transmitted with the allocated PDSCH.

FIG. 12 is a flowchart illustrating a random access procedure for an eMTC UE and an NB-IoT UE. In an initial state of FIG. 12, the UE 100 is in the RRC idle state. The UE 100 performs a random access procedure for transiting to the RRC connected state.

The UE 100 selects a cell of the eNB 200 as a serving cell. The UE 100 may, if a first cell selection criteria for normal coverage (first S-criteria) is not satisfied, and a second cell selection criteria for enhanced coverage (second S-criteria) is satisfied, determine that the UE 100 is in an enhanced coverage. A "UE in an enhanced coverage" means a UE that is required to use the enhanced coverage function (the enhanced coverage mode) to access a cell. It is noted that it is mandatory for the eMTC UE to use the enhanced coverage mode.

As illustrated in FIG. 12, in step S1001, the eNB 200 transmits PRACH (Physical Random Access Channel) related information by broadcast signaling (for example, SIB). The PRACH related information includes various parameters provided for each enhanced coverage level. As an example, a total of four levels of the enhanced coverage level, enhanced coverage levels 0 to 3 are defined. The various parameters include an RSRP (Reference Signal Received Power) threshold value, a PRACH resource, and the maximum preamble transmission number. The PRACH resource includes a radio resource (a time-frequency resource) and a signal sequence (a preamble sequence). The UE 100 stores the received PRACH related information.

In step S1002, the UE 100 measures the RSRP based on a reference signal transmitted from the eNB 200.

In step S1003, the UE 100 determines the enhanced coverage level of the UE 100 by comparing the measured RSRP with the RSRP threshold value for each enhanced coverage level. The enhanced coverage level indicates the degree of enhanced coverage required for the UE 100. The enhanced coverage level is related at least to the number of transmissions in repetition (that is, repetition count).

In step S1004, the UE 100 selects a PRACH resource corresponding to the enhanced coverage level of the UE 100.

In step S1005, the UE 100 transmits an Msg 1 (random access preamble) to the eNB 200 using the selected PRACH resource. The eNB 200 identifies the enhanced coverage level of the UE 100 based on the PRACH resource used for the received Msg 1.

In step S1006, the eNB 200 transmits, to the UE 100, an Msg 2 (random access response) including scheduling information indicating the PUSCH resource allocated to the UE 100. It is noted that until the UE 100 properly receives the Msg 2, the UE 100 can transmit the Msg 1 a plurality of times up to the maximum preamble transmission number corresponding to the enhanced coverage level of the UE 100.

In step S1007, the UE 100 transmits an Msg 3 to the eNB 200 based on the scheduling information. The Msg 3 may be an RRC Connection Request message.

In step S1008, the eNB 200 transmits an Msg 4 to the UE 100.

In step S1009, the UE 100 transits to an RRC connected state in response to the reception of the Msg 4. Thereafter, the eNB 200 controls the repetition to the UE 100 based on the identified enhanced coverage level.

(First Embodiment)

A first embodiment will be described while the mobile communication system as described above is assumed. In the first embodiment, a scenario is assumed in which a batch delivery of firmware or the like is performed by the MBMS to the new category of the UE 100 described above. Also, a case where the UE 100 in the RRC idle state receives the MBMS service distributed by the SC-PTM is mainly assumed.

The eNB 200 according to the first embodiment is an eNB 200 for the mobile communication system supporting the MBMS using the SC-PTM. The eNB 200 (transmitter 210) transmits an MBMS signal using an enhanced coverage function for enhancing its own coverage. The MBMS signal includes at least one of the MBMS control information transmitted via the SC-MCCH and the MBMS data transmitted via the SC-MTCH. The SC-MCCH and the SC-MTCH are logical channels for the SC-PTM. In this way, the eNB 200 uses the enhanced coverage function for the SC-PTM.

The enhanced coverage function may include a repetition for repeatedly transmitting the same signal. The coverage can be enhanced as a repetition count increases. The enhanced coverage function may include power boosting for increasing a power density of a transmitted signal. As an example, the power density is increased by narrowband transmission for narrowing the frequency bandwidth of a transmitted signal. As the power density of a transmitted signal increases, the coverage can be enhanced. The enhanced coverage function may include lower MCS transmission for lowering the MCS used for a transmitted signal. The coverage can be enhanced by performing transmission using the MCS with a low data rate and a high error resilience.

The eNB 200 (controller 230) notifies the UE 100 of level information indicating a radio quality level required for receiving the MBMS signal. The radio quality level may be at least one of RSRP (Reference Signal Received Power) which is a received power of the reference signal from the eNB 200, RSRQ (Reference Signal Received Quality) which is a received quality of the reference signal, and RS-SINR (Reference Signal-Signal-to-Interference-plus-Noise Ratio) which is SINR of the reference signal. An example in which the radio quality level is the RSRP will be described, but the RSRP may be replaced with the RSRQ and/or the RS-SINR. The level information may be an absolute value of the radio quality level required for receiving the MBMS signal. As an example, the level information may be an RSRP threshold value. The RSRP threshold value indicates a minimum required RSRP to receive the MBMS signal. Alternatively, the level information may be a difference (offset) value with respect to a referenenhanced coverage level of the radio quality level required for receiving the MBMS signal. The referenenhanced coverage level may be a cell selection criteria (S-criteria) used for a cell reselection operation. The cell selection criteria may be a first cell selection criteria (first S-criteria) for a normal coverage or a second cell selection criteria (second S-criteria) for an enhanced coverage.

Figure 13:
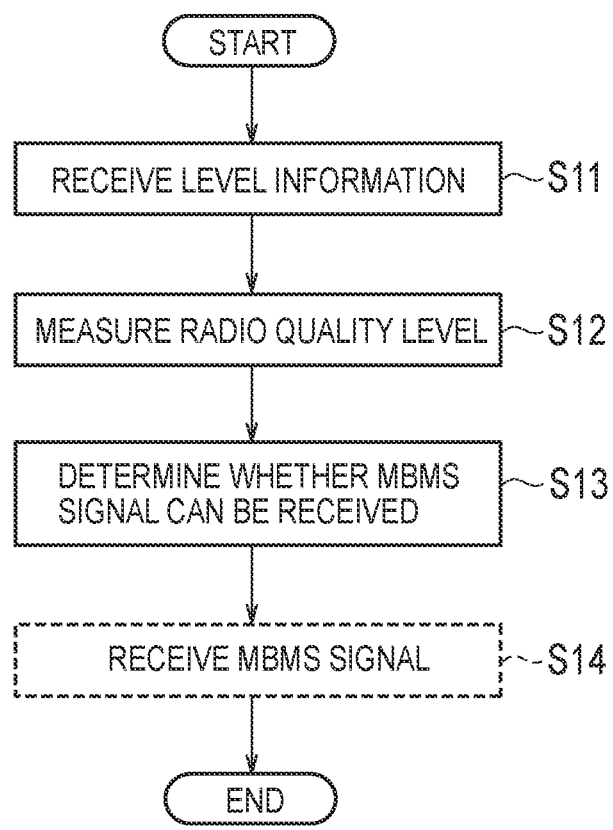
FIG. 13 is a flowchart illustrating an example of an operation flow of a UE according to the first embodiment.

The UE 100 (receiver 110) receives the level information from the eNB 200. Based on the level information, the UE 100 (controller 130) determines whether it is possible to receive the MBMS signal from the eNB 200. FIG. 13 is a flowchart illustrating an example of an operation flow of the UE 100 according to the first embodiment. In the present flow, the UE 100 is in the RRC idle state. The UE 100 is a UE present in the enhanced coverage.

As illustrated in FIG. 13, in step S11, the UE 100 (receiver 110) receives the level information from the eNB 200. The level information indicates the radio quality level required for the UE 100 to receive the MBMS signal. The radio quality level required for the UE 100 to receive the MBMS signal can be regarded as a level of the enhanced coverage. If the repetition count applied to the MBMS signal is large, if a transmission bandwidth applied to the MBMS signal is narrow, and/or if the MCS applied to the MBMS signal is low, the radio quality level required for the UE 100 to receive the MBMS signal may be low.

In step S12, the UE 100 (controller 130) measures the radio quality level (for example, the RSRP), based on the reference signal of the eNB 200.

In step S13, the UE 100 (controller 130) determines whether or not it is possible to receive the MBMS signal from the eNB 200, based on the level information and the measured radio quality level. If the measured radio quality level satisfies the level information, the UE 100 (controller 130) determines that it is possible to receive the MBMS signal from the eNB 200 (that is, to perform an SC-PTM reception). As an example, the UE 100 (controller 130) compares the measured RSRP with the RSRP threshold value indicated by the level information. If the measurement RSRP exceeds the RSRP threshold value, the UE 100 (controller 130) determines that it is possible to receive the MBMS signal from the eNB 200. On the other hand, if the measured RSRP falls below the RSRP threshold value, the UE 100 (controller 130) determines that it is not possible to receive the MBMS signal from the eNB 200, and may not perform the SC-PTM reception. Alternatively, the UE 100 (controller 130) determines that it is not possible to receive the MBMS signal (MBMS data) from the eNB 200 and may perform a process for receiving the MBMS data by unicast. As an example, the UE 100 (controller 130) may transmit an RRC connection request to the eNB 200 and transition to the RRC connected state in order to receive the MBMS data by unicast.

If the UE 100 determines that the MBMS signal can be received from the eNB 200, in step S14, the UE 100 receives the MBMS signal (performs the SC-PTM reception) from the eNB 200.

Figure 14:
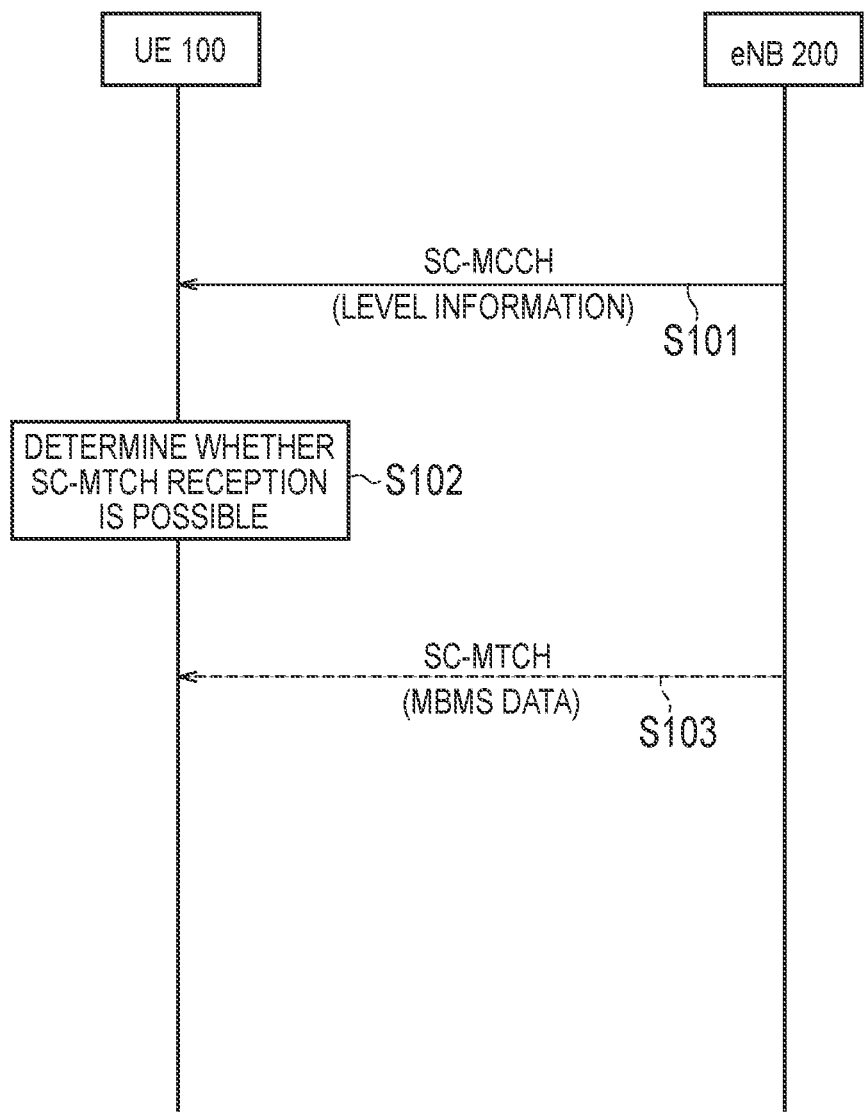
FIG. 14 is a flowchart illustrating an operation example 1 of the first embodiment.
Figure 15:
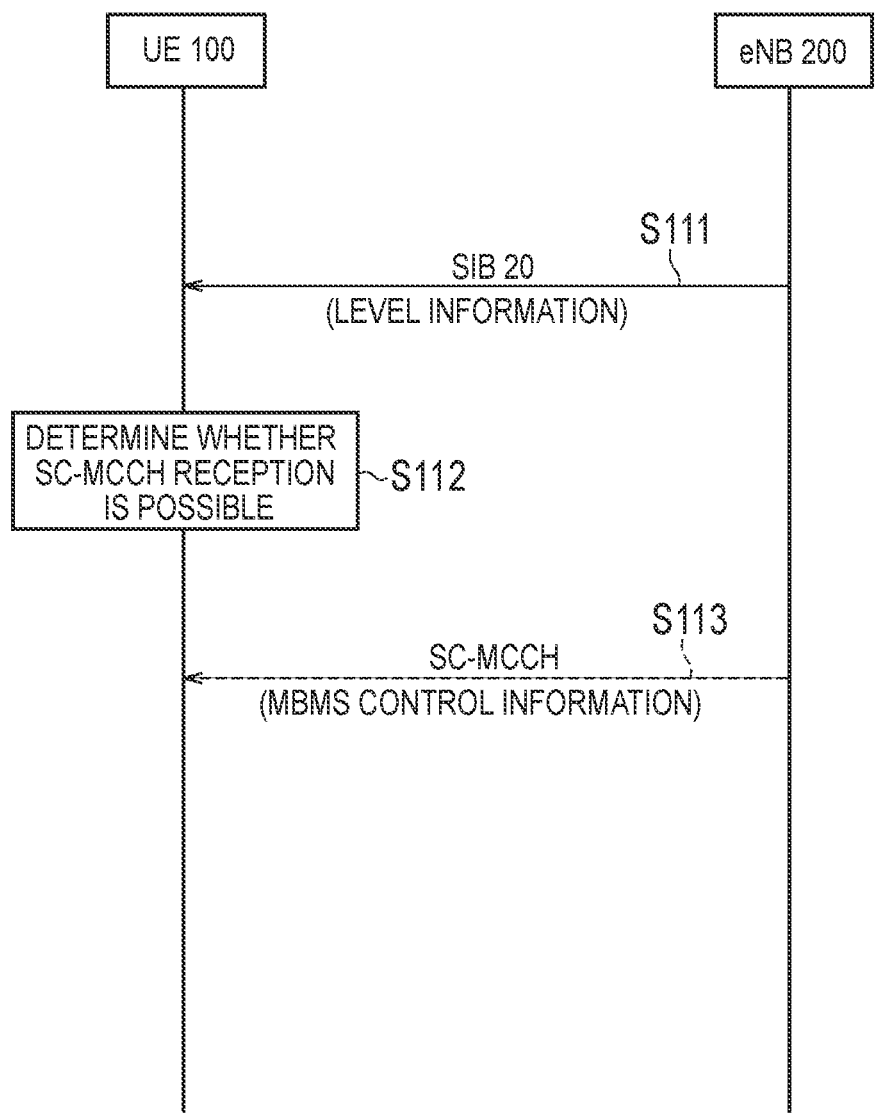
FIG. 15 is a flowchart illustrating an operation example 2 of the first embodiment.

FIG. 14 is a flowchart illustrating an operation example 1 of the first embodiment. FIG. 15 is a flowchart illustrating an operation example 2 of the first embodiment. In FIG. 14, S1 and S2 illustrated in FIG. 8 are omitted, and operations of S3 and S4 are described again. In FIGS. 15, S1 and S4 illustrated in FIG. 8 are omitted, and operations of S2 and S3 are described again.

In the operation example 1 of the first embodiment, the level information is transmitted via the SC-MCCH for transmitting information necessary for receiving the SC-MTCH (MBMS data). The level information indicates the radio quality level required for receiving the MBMS data transmitted via the SC-MTCH.

As illustrated in FIG. 14, in step S101, the eNB 200 transmits the level information via the SC-MCCH. The level information may be included in MBMS control information (SC-PTM setting information). The level information may be provided for each MBMS service (TMGI). When the level of the enhanced coverage is different for each MBMS service (TMGI), it is preferable that the level information is provided for each MBMS service (TMGI). As an example, the level information may be included into sc-mtch-InfoList including setting of each SC-MTCH. In this case, the level information may be included into each SC-MTCH-Info in the sc-mtch-InfoList.

In step S102, the UE 100 determines whether it is possible to receive the MBMS signal (MBMS data) from the eNB 200, based on the level information received from the eNB 200. As an example, the UE 100 acquires the level information corresponding to the TMGI of an MBMS service which the UE 100 is interested in receiving (that is, an MBMS service which the UE 100 wishes to receive), and determines whether or not the radio quality level measured by the UE 100 satisfies the level information. If the radio quality level measured by the UE 100 satisfies the level information, the UE 100 determines that the UE 100 can receive MBMS data belonging to the MBMS service which the UE 100 is interested in receiving via the SC-MTCH, and receives the MBMS data, via the SC-MTCH (step S103).

On the other hand, if the radio quality level measured by the UE 100 does not satisfy the level information, the UE 100 may determine that the UE 100 cannot receive the MBMS data belonging to the MBMS service which the UE 100 is interested in receiving, via the SC-MTCH. In this case, the UE 100 may to perform the SC-PTM reception. Alternatively, the UE 100 may perform a process for receiving, by unicast, the MBMS data belonging to the MBMS service which the UE 100 is interested in receiving.

In the operation example 2 of the first embodiment, the level information is transmitted via a system information block (SIB 20) including information necessary for receiving the SC-MCCH (MBMS control information). The system information block includes the level information. The level information indicates the radio quality level required for receiving the SC-MCCH. In the operation example 2 of the first embodiment, a scenario in which a plurality of SC-MCCHs are provided in the same cell may be assumed. In this case, one SC-MCCH may be associated with one or more MBMS services (TMGIs).

As illustrated in FIG. 15, in step S111, the eNB 200 transmits the level information via the BCCH. The level information may be included in the SIB 20. The level information may be provided for each SC-MCCH. If the level of the enhanced coverage is different depending on each SC-MCCH, it is preferable that level information is provided for each SC-MCCH. As an example, the SC-MCCH information included in the SIB 20 may be at least one of ID of the SC-MCCH, a transmission NB (narrow band), a transmission carrier (bandwidth of one resource block in the NB-IoT), and a corresponding TMGI.

In step S112, the UE 100 determines whether or not the UE 100 can receive the MBMS signal (MBMS control information) from the eNB 200, based on the level information received from the eNB 200. As an example, the UE 100 acquires the level information of the SC-MCCH corresponding to the TMGI of the MBMS service which the UE 100 is interested in receiving (that is, the MBMS service which the UE 100 wishes to receive), and determines whether or not the radio quality level measured by the UE 100 satisfies the level information. If the radio quality level measured by the UE 100 satisfies the level information, the UE 100 determines that the UE 100 can receive, via the SC-MCCH, the MBMS control information belonging to the MBMS service which the UE 100 is interested in receiving, and receives the MBMS control information via the SC-MCCH (step S113).

On the other hand, if the radio quality level measured by the UE 100 does not satisfy the level information, the UE 100 may determine that the UE 100 cannot receive, via the SC-MCCH, the MBMS control information belonging to the MBMS service which the UE 100 is interested in receiving. In this case, the UE 100 may to perform the SC-PTM reception. Alternatively, the UE 100 may perform a process for receiving, by unicast, the MBMS data belonging to the MBMS service which the UE 100 is interested in receiving. Further, after the operation example 2 of the first embodiment, the operation of the operation example 1 of the first embodiment (the above-described steps S102 and S103) may be continued.

As described above, according to the first embodiment, even if the enhanced coverage function is used for the SC-PTM, the UE 100 can appropriately perform the SC-PTM reception.

(Modification of First Embodiment)

In the first embodiment described above, the eNB 200 notifies the UE 100 of the level information indicating the radio quality level required for receiving the MBMS signal transmitted by the eNB 200 (its own cell). In addition to such an operation, the eNB 200 may notify the UE 100 of neighboring cell-level information indicating a radio quality level required to receive an MBMS signal transmitted by a neighboring cell. The neighboring cell-level information may include a cell identifier of the neighboring cell. In the cell reselection, the UE 100 controls not to reselect a neighboring cell in which the interested MBMS service cannot be received, based on the neighboring cell-level information. In other words, the UE 100 may reselect the neighboring cell if the UE 100 can receive the interested MBMS service, based on the neighboring cell-level information.

(Second Embodiment)

A second embodiment will be described while focusing on a difference from the first embodiment, below. The second embodiment is an embodiment in which the level information according to the first embodiment is used for a cell reselection operation.

Typically if the UE 100 needs the enhanced coverage function involving the repetition (that is, if the UE 100 is present in the enhanced coverage), the UE 100 (controller 130) selects a cell based on a radio quality-based ranking. Specifically, if the current serving cell cannot be accessed unless using the enhanced coverage function, the UE 100 applies a ranking using an "S-criteria" and an "R-criteria" for the enhanced coverage to the same frequency (intra-frequency) and another frequency (inter-frequency). In other words, the UE 100 present in the enhanced coverage preferentially selects a cell with the best radio quality (reception level) without considering a frequency priority. An operation in this case is similar to the operation where "(B2) The priority of the frequency of the neighbouring cell is identical to the priority of the current serving cell" of the "Overview of cell reselection operation".

However, in such a method, the UE 100 may select a frequency or a cell for which the MBMS service is not provided. Therefore, the UE 100 receiving or being interested in receiving the MBMS service may not be able to continuously receive the MBMS service.

In the second embodiment, if the UE 100 (controller 130) is receiving or interested in receiving an MBMS signal transmitted at a predetermined frequency, the UE 100 (controller 130) determines, based on the level information received from the eNB 200, whether or not the MBMS signal can be received at the predetermined frequency. When the UE 100 determines that the MBMS signal can be received at the predetermined frequency, the UE 100 (controller 130) preferentially selects a cell belonging to the predetermined frequency, in a cell reselection operation for selecting, as a serving cell, a cell different from the current serving cell.

Specifically, if the UE 100 determines that the MBMS signal can be received at the predetermined frequency, the UE 100 (controller 130) sets the predetermined frequency to a highest priority frequency in the cell reselection operation. As an example, even if the enhanced coverage function is required for the UE 100, if the UE 100 is receiving or interested in receiving the MBMS service, the UE 100 (controller 130) preferentially selects a cell belonging to the frequency (predetermined frequency) at which the MBMS service is provided without using the ranking. In other words, a UE 100 present in the enhanced coverage considers the frequency (or the cell) where the MBMS service is provided as the highest priority and does not perform the ranking if the UE 100 is interested in receiving an MBMS service provided by the SC-PTM. As a result, even the UE 100 present in the enhanced coverage can continuously receive the MBMS service.

Such an operation may be specified as "if being able to receive an MBMS service only while camping at a frequency for providing the MBMS service, a UE receiving or being interested in receiving the MBMS service can consider the frequency as the highest priority, irrespective of the UE being present in the enhanced coverage". Alternatively, it may be specified that "if the current serving cell cannot be accessed unless using the enhanced coverage function, and if the frequency having the highest priority for providing the MBMS service is not set, a ranking using the "S-criteria" or the "R-criteria" for the enhanced coverage is applied to the same frequency (intra-frequency) and another frequency (inter-frequency)."

Figure 16:
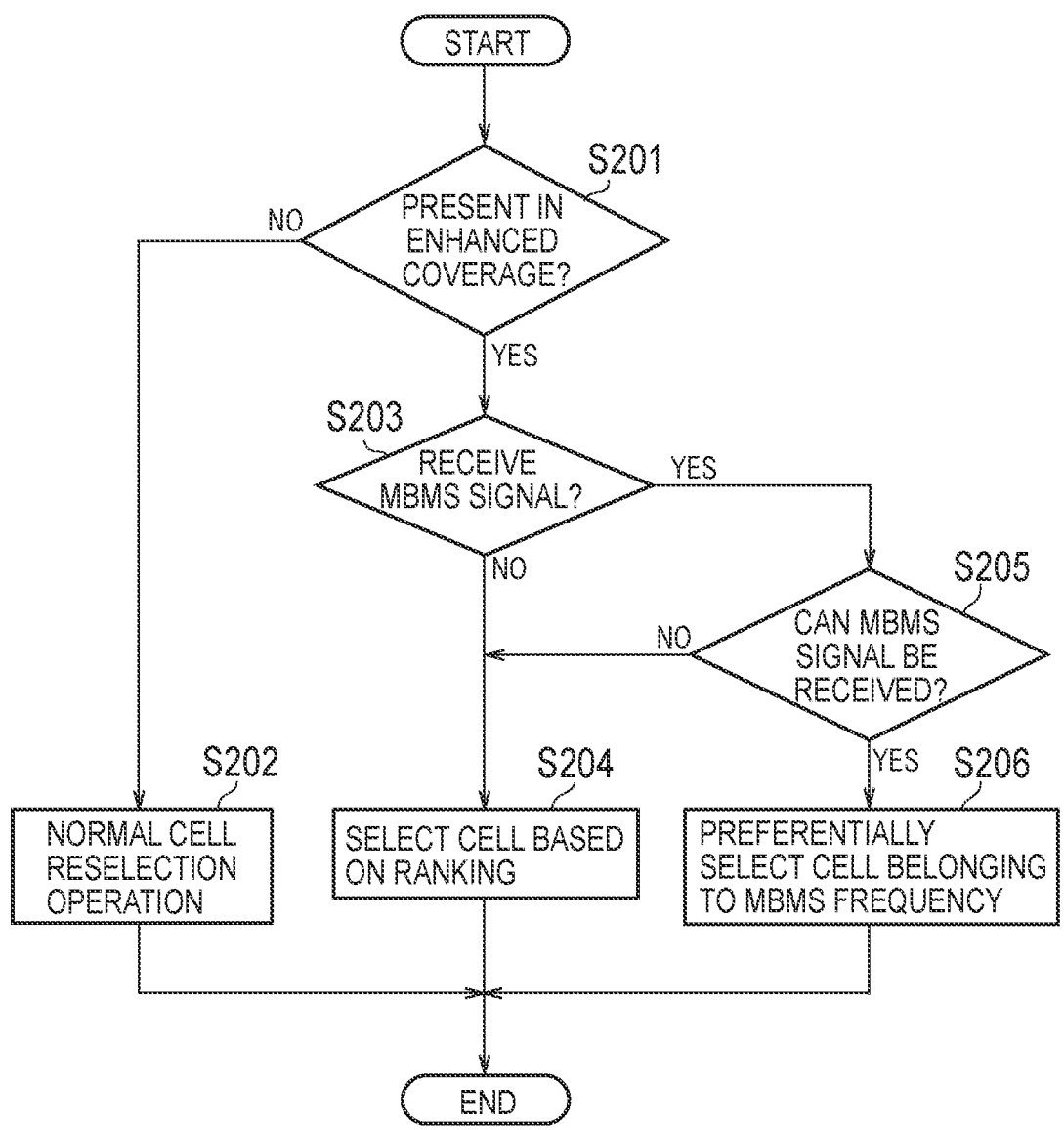
FIG. 16 is a flowchart illustrating an example of an operation flow of a UE according to a second embodiment.

FIG. 16 is a flowchart illustrating an example of an operation flow of the UE 100 according to the second embodiment.

As illustrated in FIG. 16, in step S201, the UE 100 in the RRC idle state determines whether or not the enhanced coverage function is required for the UE 100 itself (that is, whether or not the UE 100 itself is present in the enhanced coverage). If the enhanced coverage function is not required for the UE 100 itself (step S201: NO), in step S202, the UE 100 performs a normal cell reselection operation as in the "Overview of cell reselection operation" described above.

On the other hand, if the enhanced coverage function is required for the UE 100 (step S201: YES), in step S203, the UE 100 determines whether or not the UE 100 is receiving or interested in receiving the MBMS service. If the UE 100 is not receiving the MBMS service and is not interested in receiving the MBMS service (step S203: NO), in step S204, the UE 100 preferentially selects a cell having the best radio quality, by using the ranking without considering the frequency priority.

If the UE 100 is receiving or interested in receiving the MBMS service (step S203: YES), in step 205, the UE 100 receives, from the eNB 200, the level information corresponding to the frequency at which the MBMS service is provided, and based on the level information, the UE 100 determines whether or not the UE 100 can receive the MBMS signal at the predetermined frequency. When the UE 100 determines that it is not possible to receive the MBMS signal at the predetermined frequency (step S205: NO), in step S204, the UE 100 may preferentially select the cell having the best radio quality by using the ranking without considering the frequency priority. Alternatively, the UE 100 may perform a process for receiving, by unicast, the MBMS data belonging to the MBMS service which the UE 100 is interested in receiving.

If the UE 100 determines that it is not possible to receive the MBMS signal at the predetermined frequency (step S205: YES), in step 206, the UE 100 preferentially selects a cell belonging to the frequency at which the MBMS service is provided without performing the ranking.

As described above, according to the second embodiment, the UE 100 receiving or being interested in receiving the MBMS service can continuously receive the MBMS service.

(Modification of Second Embodiment)

In a modification of the second embodiment, if the UE 100 (controller 130) determines that the MBMS signal can be received at a predetermined frequency at which the MBMS service that the UE 100 is receiving or interested in receiving is provided, in the cell reselection operation, the UE 100 ranks cells belonging to the predetermined frequency, based on the radio quality.

In the modification of the second embodiment, if the UE 100 (controller 130) needs to use the enhanced coverage function, the UE 100 performs the cell reselection according to the ranking based on the radio quality. If the UE 100 (controller 130) needs to use the enhanced coverage function and the UE 100 is receiving or interested in receiving the MBMS signal, the UE 100 (controller 130) ranks the cells belonging to the frequency at which the MBMS signal is transmitted. In this manner, by limiting the cells subject to ranking to the cells belonging to the frequency at which the MBMS signal is transmitted, the UE 100 can continuously receive the MBMS service.

Such an operation may be specified that "if the current serving cell cannot be accessed unless using the enhanced coverage function, a ranking is applied to the same frequency (intra-frequency) and another frequency (inter-frequency). If the UE is receiving or interested in receiving the MBMS service, the ranking is applied to the cells of the frequency at which the UE 100 is interested".

Figure 17:
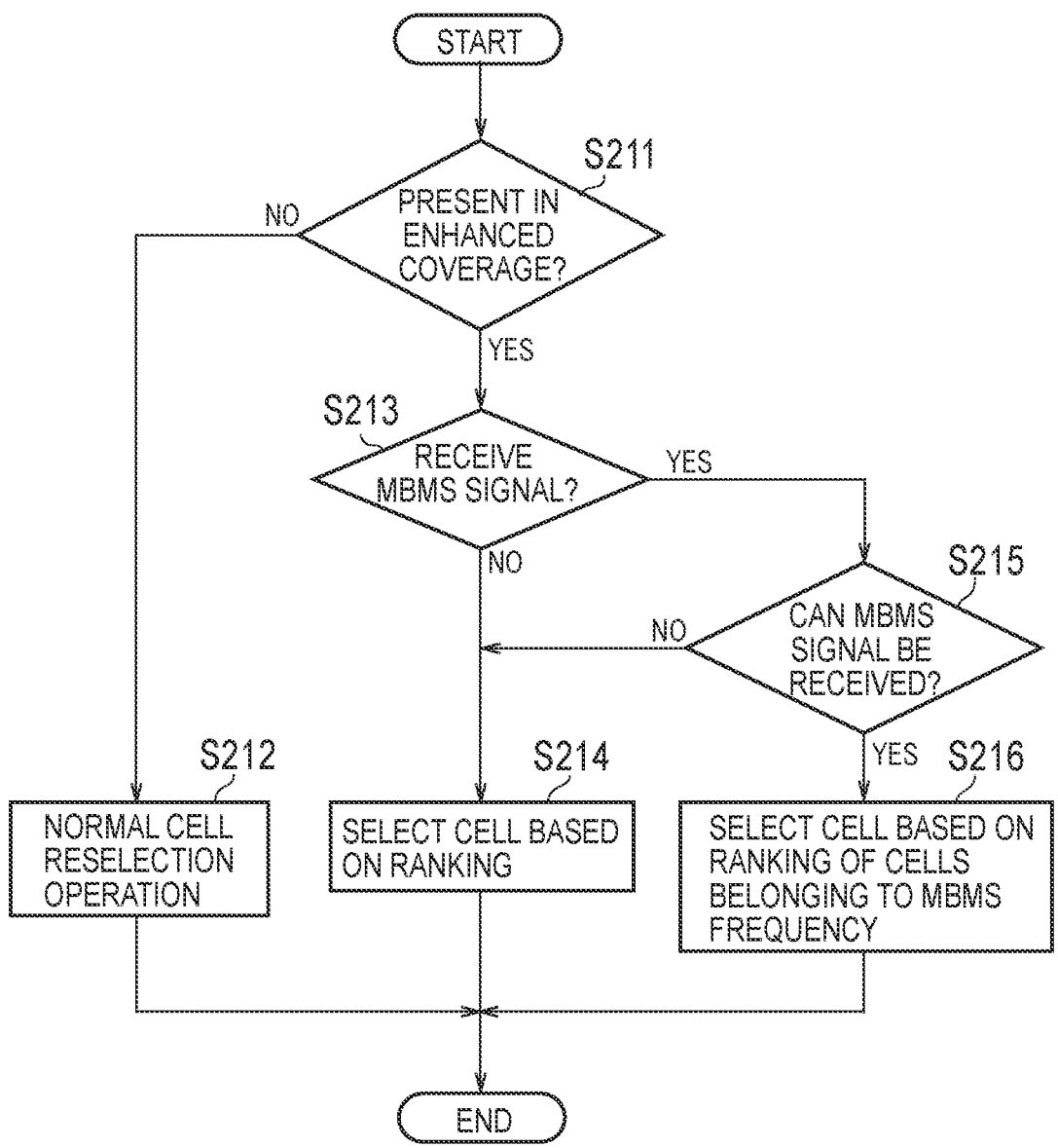
FIG. 17 is a flowchart illustrating an example of an operation flow of the UE according to a modification of the second embodiment.

FIG. 17 is a flowchart illustrating an example of an operation flow of the UE 100 according to the modification of the second embodiment.

As illustrated in FIG. 17, steps S211 to S214 are similar to steps S201 to S204 of FIG. 16. If the UE 100 is not receiving the MBMS service and is not interested in receiving the MBMS service (step S213: NO), in step S214, the UE 100 preferentially selects a cell having the best radio quality, by using the ranking without considering the frequency priority.

If the UE 100 is receiving or interested in receiving the MBMS service (step S213: YES), in step 215, the UE 100 receives, from eNB 200, the level information corresponding to the frequency at which the MBMS service is provided, and based on the level information, the UE 100 determines whether or not the UE 100 can receive the MBMS signal at the predetermined frequency. When the UE 100 determines that it is not possible to receive the MBMS signal at the predetermined frequency (step S215: NO), in step S214, the UE 100 may preferentially select the cell having the best radio quality by using the ranking without considering the frequency priority. Alternatively, the UE 100 may perform a process for receiving, by unicast, the MBMS data belonging to the MBMS service which the UE 100 is interested in receiving.

If the UE 100 determines that it is not possible to receive the MBMS signal at the predetermined frequency (step S215: YES), in step S216, the UE 100 ranks the cells belonging to a predetermined frequency at which the MBMS service that the UE 100 is receiving or interested in receiving is provided, and selects a cell belonging to the predetermined frequency.

(Other Embodiments)

In the above-described second embodiment and modification thereof, although the level information is used for the cell reselection operation, the level information may not necessarily be used for the cell reselection operation. If the level information is not used for the cell reselection operation, the step S205 in FIG. 16 and the step S215 in FIG. 17 are unnecessary.

In the above-described embodiments, the level information for determining whether or not the MBMS service in the enhanced coverage can be received is provided, but the present invention is not limited thereto. The level information may be used as a threshold value for determining whether or not to measure the intra-frequency (same frequency) in the cell reselection operation. Specifically, if the received signal quality of the serving cell is higher than the level information, the UE 100 may not perform the measurement process of the intra-frequency, and if the received signal quality falls below the level, the UE 100 performs the measurement process of the intra-frequency. The level information for determining whether or not the MBMS service can be received may be the same as the level information for determining whether to perform the measurement process or may be another value.

In the above-described embodiments, the MBMS scenario using the SC-PTM is mainly assumed, but an MBMS scenario using the MBSFN may be assumed. As an example, in the above-described embodiments, the SC-PTM may be replaced by the MBSFN, the SC-MCCH may be replaced by the MCCH, and the SC-MTCH may be replaced by the MTCH.

Each of the above-described embodiments may be implemented independently; two or more embodiments may be combined and implemented. For example, a part of the processing according to one embodiment may be added to another embodiment. Alternatively, the part of the processing according to one embodiment may be replaced by a part of the configuration of another embodiment.

In the above-described embodiments, a firmware delivery is assumed as the MBMS service. However, an MBMS service such as a group message delivery, a group chat message delivery, a delivery of a virus definition file, a scheduled update file delivery such as a weather forecast, an unscheduled file delivery such as a news bulletin, a nighttime file delivery (off peak delivery) such as a video content, an audio/video streaming delivery, a telephone/video phone (group communication), a live video delivery, and a radio audio delivery may be assumed.

In the above-described embodiments, the LTE system is exemplified as the mobile communication system. However, the present invention is not limited to the LTE system. The present invention may be applied to the mobile communication system other than the LTE system.

[Supplementary Note 1]

(1. Introduction)

In this supplementary note, the details of cell reselection for multicast reception during the UE is in Enhanced coverage are discussed.

(2. Discussion)

(2.1. Background)

Different UE categories have different backgrounds for Rel-14 multicast enhancements, as summarized in Table 1. Table 1 illustrates Rel-13 functionality in RRC IDLE.

TABLE 1

|  | LTE | eMTC | NB-IoT |
|---|---|---|---|
| Priority handling in normal coverage | Yes | Yes | — |
| Ranking in Enhanced coverage | Yes | Yes | Yes |
| MBMS reception in normal coverage | Yes | — | — |
| MBMS reception in Enhanced coverage | — | — | — |

The issue to support MBMS reception in Enhanced coverage is how the UE can reliably receive the MBMS service of interest based on a reselection procedure applicable for Enhanced coverage, regardless of UE categories. In other words, the solution is applicable to not only FeMTC UE and eNB-IoT UE but also LTE UE.

Proposal 1: The intended UE behaviour in Enhanced coverage should ensure reliable reception of MBMS service of interest based on a cell reselection procedure applicable for Enhanced coverage.

Proposal 2: The solution for multicast reception in Enhanced coverage should be applicable to not only FeMTC/eNB-IoT UEs but also LTE UEs.

(2.2. Possible Solutions)

(2.2.1. Ranking Enhancements)

Rel-13 NB-IoT UE does not support the priority based reselection, so it's natural to enhance the ranking procedure from the NB-IoT UE point of view. So, the ranking-based solutions are proposed as follows.

Option 1: Ranking with offset for the cells providing SC-PTM.

"The UE adds an offset to SC-PTM cells in ranking based cell reselection"; or "a common offset for all neighbouring cells is contained in SC-MCCH to increase the probability for UEs who are receiving multi-cast service to reselect a SC-PTM cell".

Option 2: Ranking within the cells providing SC-PTM above a threshold.

"The UE performs ranking based cell reselection only with (if available) SC-PTM cells which of qualities are above a threshold (if suitable) or SC-PTM cells which are suitable (i.e. according to suitability check)".

Regarding Option 1, the intended UE behaviour should be based on not probability but reliability of MBMS reception as mentioned in Proposal 1. So, the only "infinite" offset may ensure the reliability, while the ranking process is no longer useful since there is no "rank" between SC-PTM cells with the offset.

Regarding Option 2, a threshold works for better suitability check and it's aligned with the agreement that "UE need to know whether to attempt to receive a SC-PTM transmission or not, based on the UE radio conditions vs. the expected coverage of the SC-PTM transmission". But there is no longer need for the ranking process, i.e., it could be in principle up to UE implementation which cell to be camped on as long as SC-PTM could be received successfully.

Observation 1: A "threshold" per TMGI is useful for the UE to check whether the multicast service of interest on that cell can be received successfully.

In general, the ranking process is quite useful for unicast, since the UE tries to reselect the cell offers normal coverage which minimizes the resource consumption after transition to RRC Connected with e.g., link adaptation. But for multicast case, the ranking is no longer meaningful since the problem is not the amount of resources of SC-PTM, i.e., as agreed that "In Rel-14 we will not have a solution with feedback"and retransmission, but only whether the UE can receive the MBMS service of interest. In addition, it may cause unnecessary UE's power consumption due to the inter-frequency measurements for the ranking process.

Proposal 3: The ranking process has no reason to be standardized for multicast reception, i.e., it's up to UE implementation which cell the multicast service of interest to be received from.

(2.2.2. Priority Handling Support)

On the other hand, LTE UE already has the stable specification in the cell reselection priorities handling with the concept of "highest priority". From the LTE UE's perspective, it's no reason to deviate from the existing mechanism for support of multicast reception in CE.

Observation 2: LTE UE already has the reliable method to reselect the cell providing the MBMS service of interest, with the concept of "highest priority".

Rel-13 eMTC UE also supports the cell reselection priorities handling process, so it's straightforward for FeMTC UE to support the remaining part of the process, i.e., the priority handling for MBMS.

Observation 3: Rel-13 eMTC UE already supports the cell reselection priorities handling process, and it could be the applicable to Rel-14 FeMTC UE.

The concern is whether to increase the UE complexity for eNB-IoT, if the priorities handling process is supported. But it could be considered that the impacts for supporting priority handling is similar to or even less than the continued use of ranking-based solutions for SC-PTM, i.e., in terms of the same intended UE behaviour and the cost of inter-frequency measurements. From the standard impact point of view, it's necessary to only support the part related to reception of MBMS services (See Annex), even if the priorities handling process is to be supported by eNB-IoT.

Therefore, eNB-IoT UE which is capable of SC-PTM reception should support the existing priority handling process (but only for the part related to MBMS services).

Proposal 4: RAN2 should decide to reuse the existing priority handling process for multicast reception in Enhanced coverage by LTE UE, FeMTC UE and eNB-ioT UE.

(2.2.3. Proposed Merged Solution)

Unless there is the cell which is considered as the highest priority and suitable for SC-PTM reception of interest (i.e., reliability check with "a threshold"), Ranking with cell selection criterion S for enhanced coverage is applied for intra-frequency and inter-frequency cell reselection when the current serving cell can only be accessed using enhanced coverage.

Proposal 5: RAN2 should discuss how to enhance the section 4.4 and 5.2.4.6a in TS 36.304.

Proposal 6: RAN2 should consider the means of "suitable check", based on RAN1's input.

[Supplementary Note 2]

(1. Introduction)

In this supplementary note, the details of SC-PTM service continuity for FeMTC/eNB-IoT are described.

(2. Discussion)

(2.1. Rel-13 mechanism)

Figure 18:
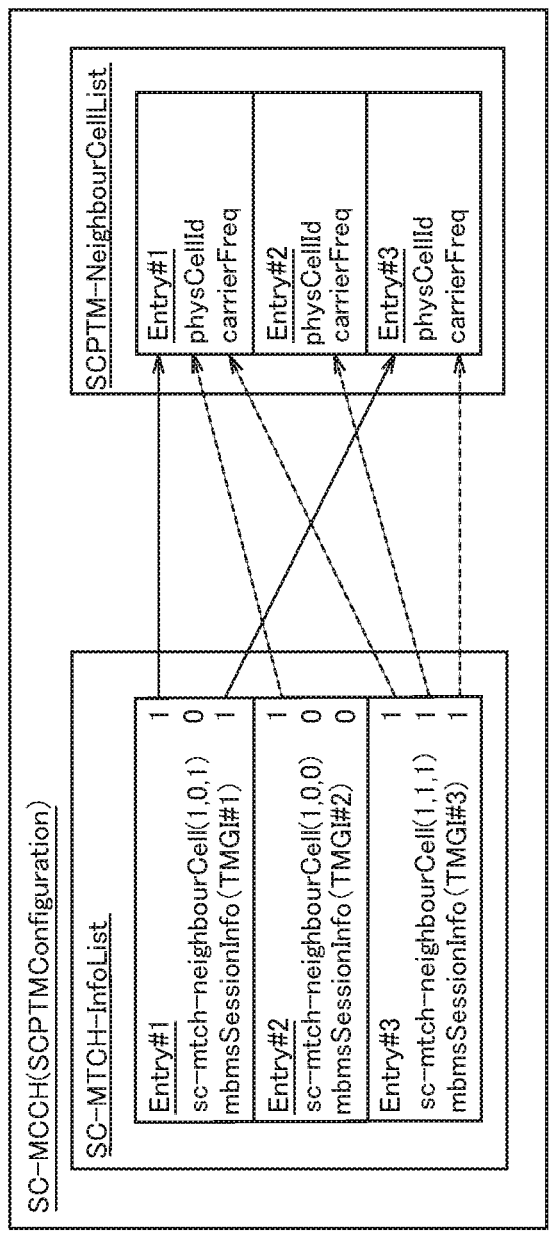
FIG. 18 is a diagram according to the supplementary note.

In Rel-13, the SC-MCCH provides the information for service continuity, in order for the UE to easily find the MBMS service(s) of interest served on the other frequency/cell. In detail, SCPTM-NeighbourCellList contains cell ID and frequency and sc-mtch-neighbourCell per TMGI indicates within its bit string whether each entry of the list provides the MBMS service or not (see FIG. 18).

On the other hand, SIB15 provides similar information but it was mainly intended for MBSFN. In detail, MBMS-SAI-List containing MBMS Service Area ID is provided for intra-frequency and also provided together with dl-Carrier-Freq for inter-frequency.

Compared to SIB15, SC-MCCH added the cell ID into service continuity information because of granularity change, i.e., from multi-cell broadcast (or single-frequency network) to single-cell PTM. So, the exact information of which resource provides the MBMS service of interest was already identified in Rel-13 as useful for service continuity (and also for UE battery consumption upon cell reselection).

Observation 1: For service continuity of SC-PTM, Rel-13 included the cell IDs in SC-MCCH where MBMS service(s) are provided, due to the change from single-frequency to single-cell multicast.

(2.2. Rel-14 Service Continuity Enhancements)

It has not yet been decided whether to enhance service continuity information is not determined yet. As in Observation 1, it's first necessary to look at whether the granularity of resource is changed in Rel-14. It's quite obvious to support the multicast on different assumption of radio resource from the previous release since RAN2 aims to "Introduction of necessary enhancements to support narrowband operation, e.g. support of MPDCCH, and coverage enhancement, e.g. repetitions". Also, the different use case is stated in the WID that "e.g. firmware or software updates, group message delivery". The changes are identified as follows.

Operation: Wideband in Rel-13 to Narrowband in Rel-14

Coverage: Normal coverage in Rel-13 to Enhanced coverage in Rel-14;

Use case (but not limited to): MCPTT in Rel-13 to Firmware/software update and Group message delivery in Rel-14.

Observation 2: The assumptions/objectives of multicast are changed in Rel-14.

Therefore, RAN2 should discuss whether the service continuity needs to be enhanced for each change.

(2.2.1. Narrowband Operation)

As mentioned in Observation 1, it's useful to extend the service continuity information when the resource granularity is changed, which is also applicable to the narrowband multicast in Rel-14. It could be considered that there are two options as follows.

Option 1: Indicate whether the MBMS service is provided in a narrowband/carrier.

This is simple extension to indicate whether the SC-MTCH is receivable by BL UE/NB-IoT UE. For example, it may be implemented in SC-MTCH-InfoList as FIG. 19. However, sc-mtch-neighbourCell-BL indicates whether the SC-MTCH is provided within a narrowband (i.e., 6 PRBs), and sc-mtch-neighbourCell-NB indicates whether the SC-MTCH is provided within a carrier (i.e., 1 PRB).

Option 2: Indicate which narrowband/carrier the MBMS service is provided in.

It may be also useful that the SC-MCCH provides the information e.g., where the MBMS service is provided on the neighbour cell, as similar to RAN2's agreement that "SIB20 indicate the carrier for SC-MCCH, and SC-MCCH indicate the carrier for MTCH". However, it may be difficult for the eNB to provide similar information under FeMTC, i.e., which Narrowband the MBMS service is provided, since it may be assumed to be somewhat dynamically configurable within a system bandwidth. For example, it may be implemented in SCPTM-NeighbourCellList as FIG. 20. However, NarrowbandOperation indicates whether SC-PTM is provided within a narrowband (i.e., 6 PRBs), and carrierFreqOffset indicates where the anchor carrier (i.e., 1 PRB) providing SC-PTM is, as it is today in CarrierFreq-NB.

For FeMTC UEs, these options are quite similar but there is some difference regarding eNB-IoT UEs. With Option 1, the UE needs to search which carrier provides SC-PTM on neighbour cells, while Option 2 facilitates more smooth mobility. However, if it's the case that multiple anchor carriers broadcast multiple (different) SIB20s, Option 2 may need multiple IEs, e.g., a list, which causes additional overhead.

Both options have pros and cons. However, it's obvious that some sort of information on narrowband/carrier operation is necessary, as the enhancements in Rel-14 multicast for FeMTC/eNB-IoT.

Proposal 1: RAN2 should discuss if the narrowband operation of SC-PTM in the neighbour cells should be provided.

(2.2.2. Enhanced Coverage)

The other enhancement in Rel-14 is to support multicast in Enhanced Coverage, which is facilitated by e.g., repetition, power boosting and MCS selection. Although it's still "FFS if we have CE levels definition for SC-PTM", it was agreed that "UE need to know whether to attempt to receive a SC-PTM transmission or not, based on the UE radio conditions vs. the expected coverage of the SC-PTM transmission. FFS if the UE can do this based on knowing MCS and repetitions". If the "coverage boost level (i.e., some threshold or "offset" to normal coverage for SC-PTM reception reliability check)" is assumed to be provided by the serving cells, then it should also be considered whether the coverage boost levels from the neighbour cells should also be included in the serving cell to facilitate service continuity, i.e., in order to minimize the packet loss.

Proposal 2: RAN2 should discuss if the information of SC-PTM coverage (e.g., number of repetition, power boost level and MCS, or some integrated threshold/offset for reliability check) of the neighbour cells should be provided by the serving cell.

(2.2.3. Firmware/Software Update and Group Message Delivery)

From the service continuity point of view, the difference in Rel-14 (e.g., file delivery) is whether or not the lossless mobility is preferable, while Rel-13 (e.g., streaming) rather requited the lower access latency. However, the multicast is difficult to ensure the lossless mobility in the AS layer, since it's already agreed that "In Rel-14 we will not have a solution with feedback" and retransmission, and it depends on the eNB's scheduler (e.g., the packet delivery is not synchronized among eNBs in a network). But as we discussed in the last meeting, the upper layer mechanism, i.e., FLUTE, would compensate the packet loss in the AS layer, e.g., by the unicast file recovery. So, the lossless mobility may also rely on some upper layer mechanism in Rel-14 multicast.

Observation 3: No additional AS mechanism is necessary for the lossless mobility for Rel-14 multicast.

However, the amount of packet loss, e.g., missed FLUTE blocks, will depend on some AS layer configuration, e.g., synchronous delivery, SIB20 scheduling periodicity, SC-MCCH repetition period and so on. It affects to number of RRC Connection Request and duration of staying in RRC Connected, e.g., for the unicast file recovery, which cause additional UE power consumption. However, it's up to NW implementation how to minimize the packet loss, except for the assistance information discussed in sections 2.2.1 and 2.2.2.

Observation 4: It's up to NW implementation in Rel-14 on how to minimize the packet loss due to UE mobility.

The invention claimed is:

1. A user equipment supporting Multimedia Broadcast Multicast Service (MBMS) service provided via Single Cell Point-To-Multipoint (SC-PTM), the user equipment comprising:
a processor and a memory coupled to the processor, wherein
the processor is configured to perform a cell reselection operation for selecting a cell different from a current serving cell as a serving cell,
when the user equipment is in an enhanced coverage, the processor is configured to perform the cell reselection according to a ranking based on a radio quality irrespective of frequency priority, and
when the user equipment is in the enhanced coverage and the user equipment is receiving or interested in receiving an MBMS service via the SC-PTM, the processor is configured to perform the ranking on cells belonging to a SC-PTM frequency where the MBMS service is provided, wherein
the processor is configured to:
receive first coverage enhancement configuration information via system information broadcast from the serving cell, the first coverage enhancement configuration information being information on a number of repetitions of SC-PTM configuration information transmitted in a Single Cell Multicast Control Channel (SC-MCCH) associated to a Single Cell RNTI (SC-RNTI);
receive the SC-PTM configuration information via the SC-MCCH based on the first coverage enhancement configuration information, from the serving cell, the SC-PTM configuration information including second coverage enhancement configuration information on a number of repetitions of MBMS data transmitted in a Single Cell Multicast Traffic Channel (SC-MTCH) associated to a Group RNTI (G-RNTI); and
receive the MBMS data transmitted in the SC-MTCH associated to the G-RNTI, based on the second coverage enhancement configuration information.

2. An apparatus for controlling a user equipment supporting Multimedia Broadcast Multicast Service (MBMS) service provided via Single Cell Point-To-Multipoint (SC-PTM), the apparatus comprising:
a processor and a memory coupled to the processor, wherein
the processor is configured to perform a cell reselection operation for selecting a cell different from a current serving cell as a serving cell,
when the user equipment is in an enhanced coverage, the processor is configured to perform the cell reselection according to a ranking based on a radio quality irrespective of frequency priority, and
when the user equipment is in the enhanced coverage and the user equipment is receiving or interested in receiving an MBMS service via the SC-PTM, the processor is configured to perform the ranking on cells belonging to a SC-PTM frequency where the MBMS service is provided, wherein
the processor is configured to:
receive first coverage enhancement configuration information via system information broadcast from the serving cell, the first coverage enhancement configuration information being information on a number of repetitions of SC-PTM configuration information transmitted in a Single Cell Multicast Control Channel (SC-MCCH) associated to a Single Cell RNTI (SC-RNTI);
receive the SC-PTM configuration information via the SC-MCCH based on the first coverage enhancement configuration information, from the serving cell, the SC-PTM configuration information including second coverage enhancement configuration information on a number of repetitions of MBMS data transmitted in a Single Cell Multicast Traffic Channel (SC-MTCH) associated to a Group RNTI (G-RNTI); and
receive the MBMS data transmitted in the SC-MTCH associated to the G-RNTI, based on the second coverage enhancement configuration information.

3. A method comprising:
performing, by a user equipment, a cell reselection operation for selecting a cell different from a current serving cell as a serving cell, the user equipment supporting Multimedia Broadcast Multicast Service (MBMS) service provided via Single Cell Point-To-Multipoint (SC-PTM), wherein performing the cell reselection operation includes:
performing a ranking based on a radio quality irrespective of frequency priority, when the user equipment is in an enhanced coverage; and
performing the cell reselection according to the ranking, wherein
performing the ranking includes:
when the user equipment is in the enhanced coverage and the user equipment is receiving or interested in receiving an MBMS service via the SC-PTM, performing the ranking on cells belonging to a SC-PTM frequency where the MBMS service is provided, wherein
the method further comprises:
receiving by the user equipment, first coverage enhancement configuration information via system information broadcast from the serving cell, the first coverage enhancement configuration information being information on a number of repetitions of SC-PTM configuration information transmitted in a Single Cell Multicast Control Channel (SC-MCCH) associated to a Single Cell RNTI (SC-RNTI);
receiving by the user equipment, the SC-PTM configuration information via the SC-MCCH based on the first coverage enhancement configuration information, from the serving cell, the SC-PTM configuration information including second coverage enhancement configuration information on a number of repetitions of MBMS data transmitted in a Single Cell Multicast Traffic Channel (SC-MTCH) associated to a Group RNTI (G-RNTI); and
receiving by the user equipment, the MBMS data transmitted in the SC-MTCH associated to the G-RNTI, based on the second coverage enhancement configuration information.

* * * * *